(12) United States Patent
Vanderwees et al.

(10) Patent No.: US 11,031,611 B2
(45) Date of Patent: Jun. 8, 2021

(54) INTEGRATED GAS MANAGEMENT DEVICE FOR A FUEL CELL SYSTEM

(71) Applicant: Dana Canada Corporation, Oakville (CA)

(72) Inventors: Doug Vanderwees, Mississauga (CA); Michael Bardeleben, Oakville (CA); Raimund Stroebel, Ulm (DE); Joachim Scherer, Ulm (DE); Rainer Glueck, Dornstadt (DE)

(73) Assignee: Dana Canada Corporation, Oakville (CA)

( * ) Notice: Subject to any disclaimer, the term of this patent is extended or adjusted under 35 U.S.C. 154(b) by 420 days.

(21) Appl. No.: 15/917,955

(22) Filed: Mar. 12, 2018

(65) Prior Publication Data
US 2018/0205098 A1    Jul. 19, 2018

Related U.S. Application Data

(63) Continuation of application No. 14/314,853, filed on Jun. 25, 2014, now Pat. No. 9,947,946.

(Continued)

(30) Foreign Application Priority Data

Oct. 15, 2013 (DE) .................. 202013009357.9

(51) Int. Cl.
*H01M 8/04007* (2016.01)
*B01D 53/26* (2006.01)
(Continued)

(52) U.S. Cl.
CPC ...... *H01M 8/04074* (2013.01); *B01D 53/265* (2013.01); *H01M 8/04029* (2013.01);
(Continued)

(58) Field of Classification Search
CPC ......... H01M 8/04029; H01M 8/04126; H01M 8/04134; H01M 8/04141; H01M 8/04164;
(Continued)

(56) References Cited

U.S. PATENT DOCUMENTS

| 4,872,578 A | * | 10/1989 | Fuerschbach ........... F28D 9/005 |
| | | | 165/167 |
| 5,382,478 A | * | 1/1995 | Chow ............... H01M 8/04029 |
| | | | 429/414 |

(Continued)

FOREIGN PATENT DOCUMENTS

| JP | 2003-178791 A | 6/2003 |
| JP | 2003-288925 A | 10/2003 |

(Continued)

OTHER PUBLICATIONS

English Machine Translation of JP 2003-288925 A.
(Continued)

*Primary Examiner* — Eric R Smith
(74) *Attorney, Agent, or Firm* — McCoy Russell LLP

(57) ABSTRACT

An integrated gas management device (GMD) for a fuel cell has a gas-to-gas humidifier for transferring water from a second gas to a first gas; and a heat exchanger attached to a first end of the humidifier core for cooling the first gas. The GMD may optionally have a thermal isolation plate between the heat exchanger and the first end of the humidifier core. The GMD further has a bypass line to allow the first gas to bypass the humidifier. The first gas may be cathode charge air and the second gas may be cathode exhaust.

18 Claims, 12 Drawing Sheets

Related U.S. Application Data

(60) Provisional application No. 61/840,200, filed on Jun. 27, 2013, provisional application No. 61/882,210, filed on Sep. 25, 2013.

(51) Int. Cl.
*H01M 8/04119* (2016.01)
*H01M 8/04029* (2016.01)
*H01M 8/04291* (2016.01)
*H01M 8/1018* (2016.01)

(52) U.S. Cl.
CPC ... *H01M 8/04141* (2013.01); *H01M 8/04164* (2013.01); *H01M 8/04291* (2013.01); *B01D 2257/80* (2013.01); *B01D 2258/0208* (2013.01); *H01M 2008/1095* (2013.01); *H01M 2250/20* (2013.01); *Y02T 90/40* (2013.01)

(58) Field of Classification Search
CPC ......... H01M 8/04074; H01M 8/04014; H01M 8/04156; H01M 8/0267; H01M 8/04007; H01M 8/04291; H01M 8/0258; H01M 8/2465; H01M 8/2484; H01M 8/2485; F24F 3/147
See application file for complete search history.

(56) References Cited

U.S. PATENT DOCUMENTS

| | | | | |
|---|---|---|---|---|
| 5,486,430 A | * | 1/1996 | Gorbell | H01M 8/0202 429/434 |
| 6,613,467 B1 | * | 9/2003 | Chizawa | H01M 8/023 429/413 |
| 6,948,559 B2 | | 9/2005 | Reinke et al. | |
| 2001/0036568 A1 | * | 11/2001 | Farkash | H01M 8/0267 429/434 |
| 2005/0053815 A1 | | 3/2005 | Yang et al. | |
| 2006/0068250 A1 | * | 3/2006 | Bai | H01M 8/04029 429/413 |
| 2008/0241636 A1 | * | 10/2008 | Andreas-Schott | H01M 8/04149 429/409 |
| 2009/0098425 A1 | | 4/2009 | Kobayashi et al. | |
| 2009/0121366 A1 | * | 5/2009 | Leister | B01D 53/22 261/101 |

FOREIGN PATENT DOCUMENTS

| | | |
|---|---|---|
| JP | 2005-019221 | 1/2005 |
| JP | 2005-085753 | 3/2005 |
| JP | 2006-51441 | 4/2006 |
| JP | 2009-277505 | 11/2009 |
| JP | 2010-103030 A | 5/2010 |
| JP | 2011-216370 A | 10/2011 |
| WO | 2007/125945 A1 | 11/2007 |

OTHER PUBLICATIONS

English Machine Translation of JP 2010-103030 A.
English Machine Translation of WO 2007/125945 A1.
English Machine Translation of JP 2003-178791 A.
English Machine Translation of JP 2001-216370 A.

* cited by examiner

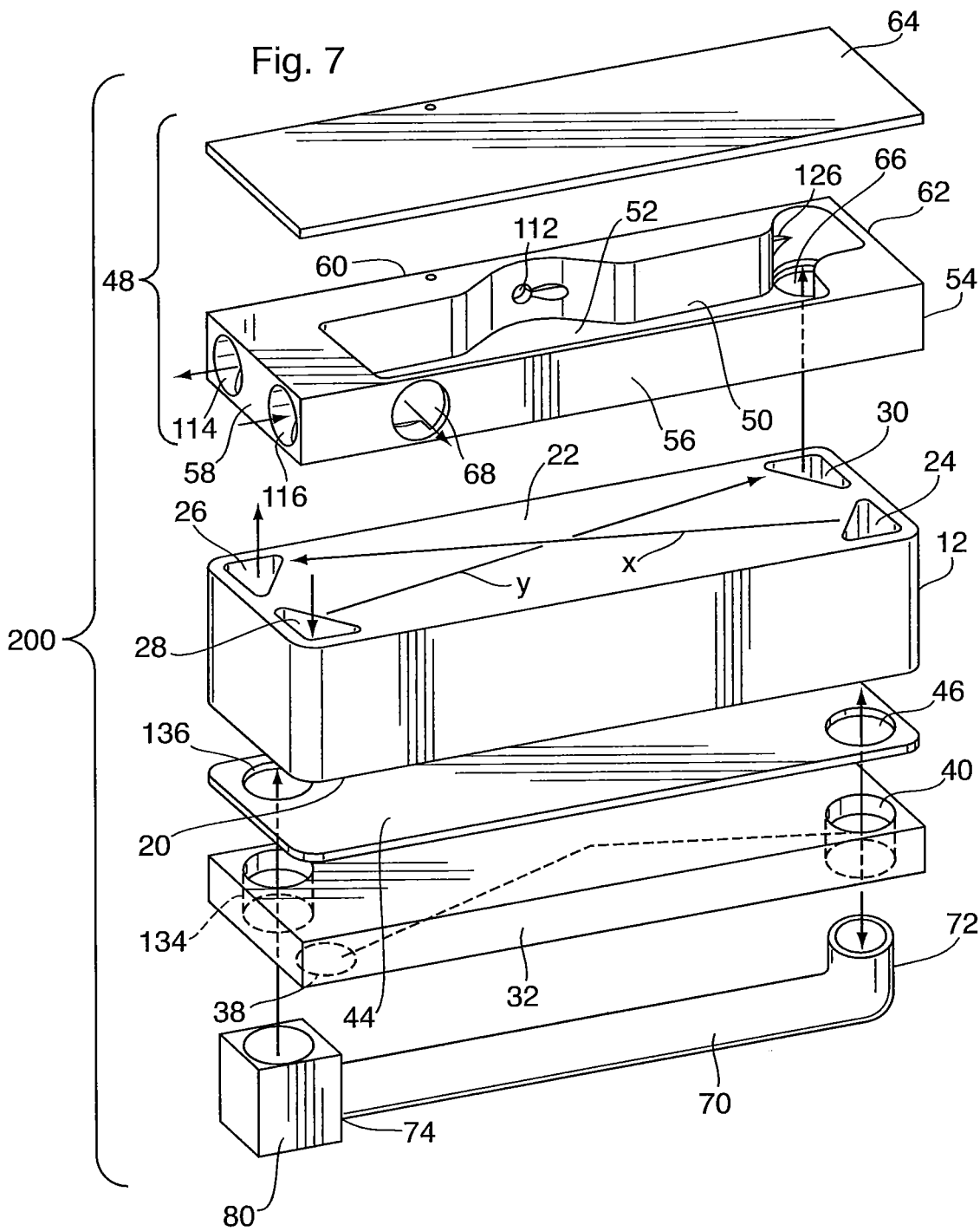

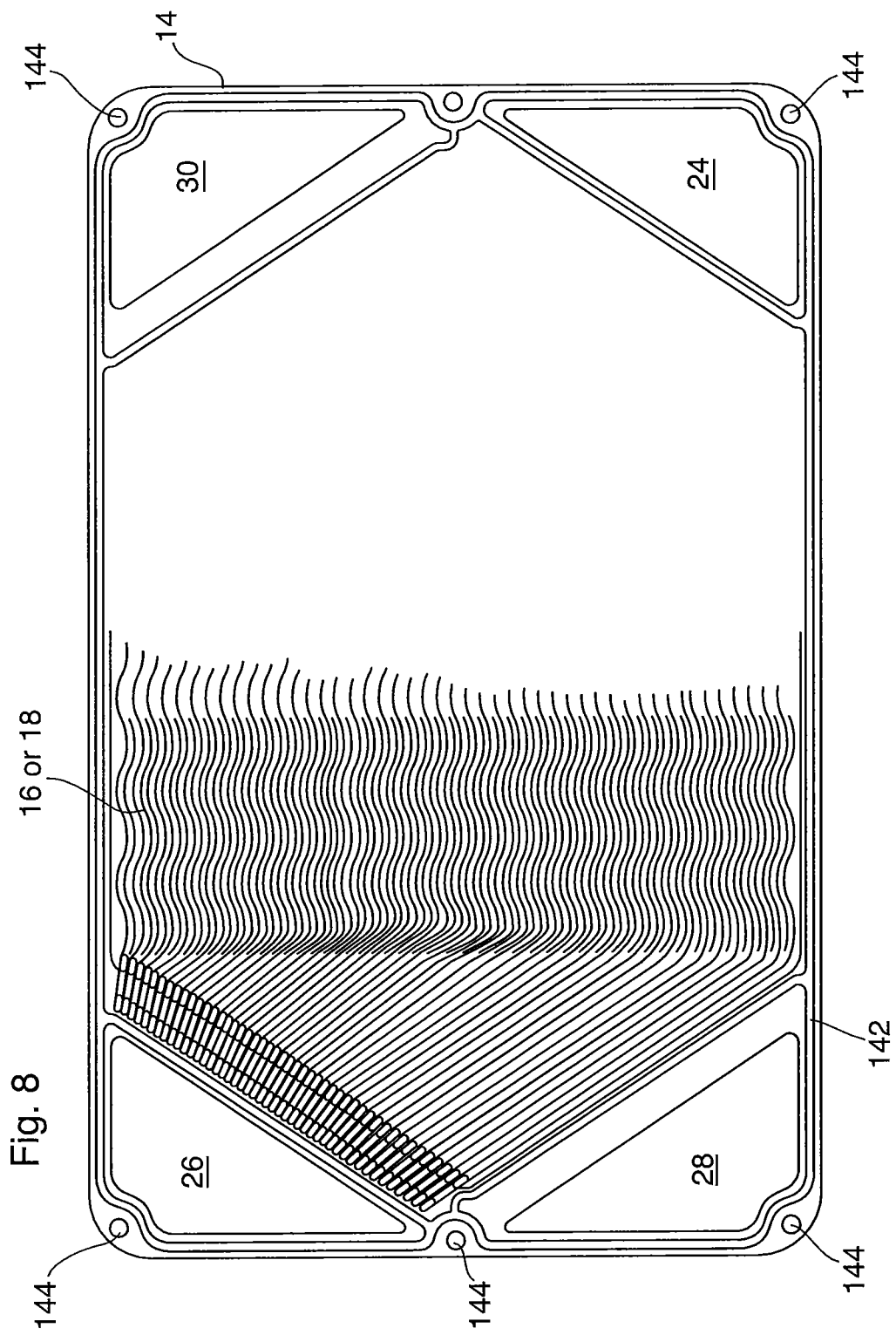

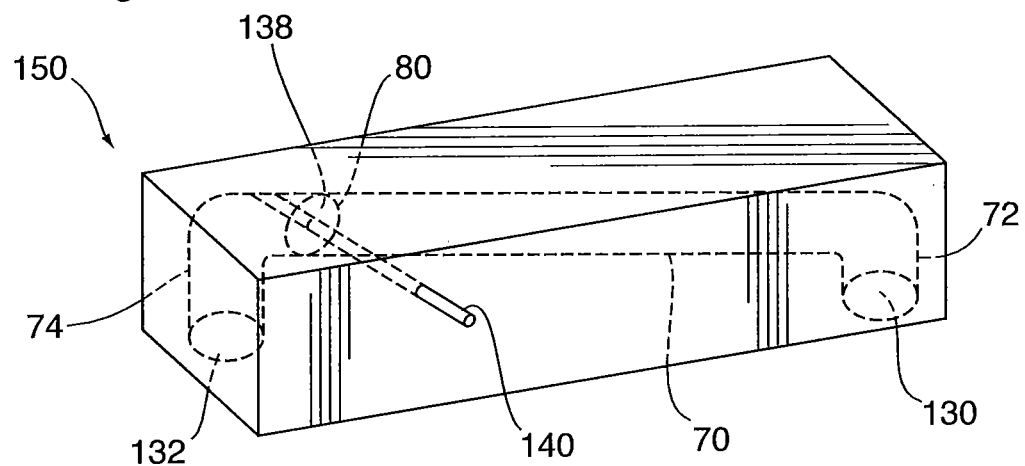
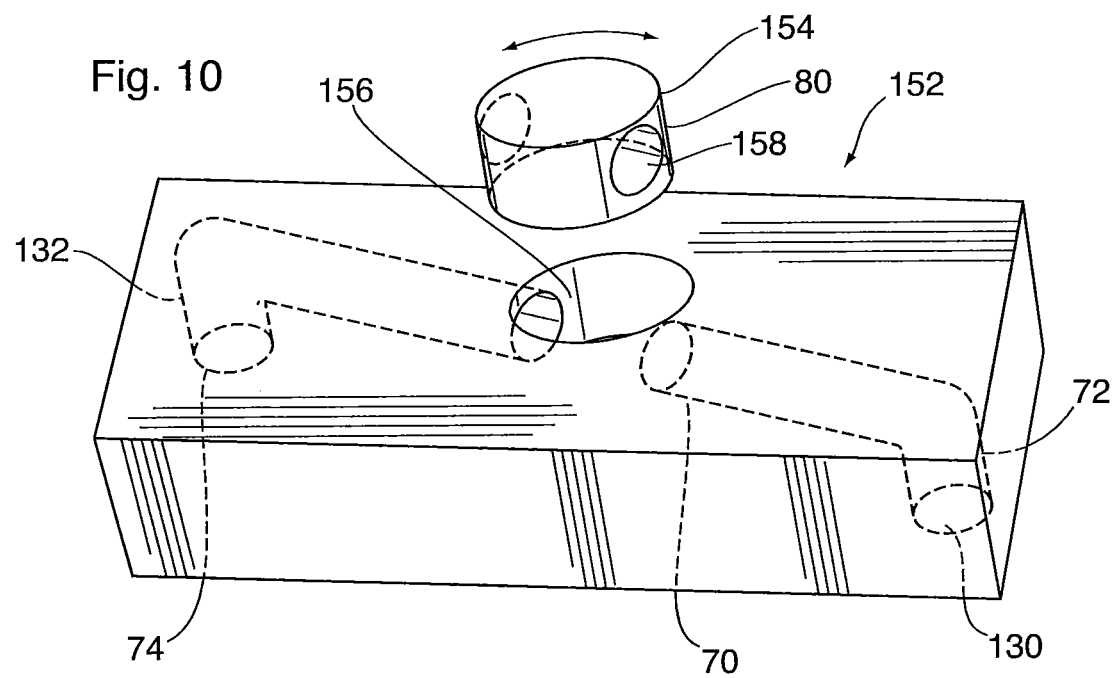

INTEGRATED GAS MANAGEMENT DEVICE FOR A FUEL CELL SYSTEM

CROSS-REFERENCE TO RELATED APPLICATION

This application is a continuation of U.S. patent application Ser. No. 14/314,853 filed on Jun. 25, 2014, the contents of which are incorporated herein by reference.

FIELD OF THE INVENTION

The invention relates to a gas management device (GMD) for a fuel cell system, such as an integrated GMD for humidifying and cooling cathode charge air in a fuel cell system, and/or for removing water from cathode exhaust in a fuel cell system.

BACKGROUND OF THE INVENTION

Fuel cell systems generate electrical power from an electrochemical reaction between a fuel and an oxidant. Many fuel cell systems use a gaseous fuel such as molecular hydrogen, and a gaseous oxidant such as molecular oxygen. Air is commonly used as the source of oxygen. The reaction between hydrogen and oxygen generates water which is exhausted in the waste gases of the fuel cell.

Many fuel cells, and especially fuel cells for automotive propulsion, are based on proton exchange membrane (PEM) technology. These fuel cells contain PEM membranes that operate in the range of about 50-120° C., and which must be kept moist for optimal performance and durability of the fuel cell.

Where air is used as the gaseous oxidant, it is brought up to the fuel cell's operating pressure by an air compressor before it is fed to the cathode of the fuel cell. However, during compression, the air can be heated to a temperature of about 200° C. or higher, which is considerably higher than the operating temperature of the fuel cell. Therefore, the pressurized charge air must be cooled to the desired temperature by a charge air cooler before it reaches the fuel cell stack.

A humidifying device may be located in-line between the air compressor and the fuel cell stack in order to increase the moisture content of the charge air to a sufficient level to prevent dehydration of the fuel cell's membranes. It is known to humidify the charge air by transfer of water vapour from the waste gases of the fuel cell, for example as disclosed in published patent application no. US 2012/0181712 A1 by Vanderwees et al. (referred to herein as Vanderwees '712), or WO 2013/092630 A1 by Stroebel et al., both of which are incorporated herein by reference in their entireties. Where the humidifying device is a membrane humidifier as disclosed by Vanderwees et al., it will have an operating temperature significantly lower than the temperature of the pressurized charge air. Therefore, it is also desirable to cool the charge air before it reaches the humidifying device.

It is apparent from the preceding discussion that numerous components are required for processing feed gas streams and exhaust gas streams in a fuel cell system. In vehicular systems in particular, these components must all fit within a finite space. Therefore, in order to save space, reduce cost, and simplify the complex nature of these systems, there is a need to provide integrated gas management devices which reduce the number of components and provide more direct connections between the components. It is nevertheless required that these systems are tightly sealed in their entirety.

SUMMARY OF THE INVENTION

It is an object of the invention to integrate a fuel cell humidifier with any one or more of: a water-cooled charge air cooler, an air-cooled charge air cooler, an anode heat exchanger, a water separator, thermal isolation plate(s), drainage valves, sensors, heaters, bypass valves, and the routing between the various components. Integration of a fuel cell humidifier reduces the number of components in the fuel cell system, reduces system packaging space, and reduces system cost.

In some embodiments of the invention, it is a specific object to integrate the core of a fuel cell humidifier comprising a stack of thin plates with a heat exchanger and/or a water separator. The integration of the fuel cell core with a heat exchanger and/or a water separator provides further specific benefits in that it allows one or both of the rigid structural end plates of the humidifier structure to be eliminated. In this structure, the rigidity of the heat exchanger and/or the water separator allow them to function as rigid structural end plates which provide the plate stack of the humidifier structure with rigidity, and between which the plates are compressed and sealed together. According to an embodiment, there is provided an integrated gas management device (GMD), comprising a gas-to-gas humidifier core and a heat exchanger attached to the first end of the humidifier core.

According to another embodiment, there is provided a GMD comprising a gas-to-gas humidifier core and a water separator attached to the second end of the humidifier core.

According to yet another embodiment, there is provided a GMD comprising a gas-to-gas humidifier core, a heat exchanger attached to the first end of the humidifier core, and a water separator attached to the second end of the humidifier core.

The humidifier core defines one or more first gas flow passages and one or more second gas flow passages, the humidifier core having a first end and a second end; a first gas inlet manifold and a first gas outlet manifold in flow communication with the first gas flow passages; and a second gas inlet manifold and a second gas outlet manifold in flow communication with the second gas flow passages; wherein the manifolds extend through the humidifier core from the first end to the second end.

The heat exchanger may be attached to the first end of the humidifier core and comprises at least one first gas flow passage and at least one coolant flow passage, and further comprises a first gas outlet opening through which the at least one first gas flow passage is in flow communication with the first gas inlet manifold of the humidifier core.

The water separator may be attached to the second end of the humidifier core. The water separator has an internal water separation chamber in flow communication with a second gas inlet opening and a second gas outlet opening, and wherein the second gas inlet opening of the water separator is in flow communication with the second gas outlet manifold of the humidifier core.

It is thus the object of the present invention to provide for a fuel cell humidifier which is integrated in a system that also comprises at least one of a heat exchanger and a water separator with the system being constructed in a compact manner. The humidifier system needs to be homogeneously compressed to be tightly sealed in order to prevent from any leakage of the gases and of humidity. The compression elements must thus be combined in such a way that they provide sufficient stiffness to allow for a tight sealing. In advantageous embodiments, it is an object of the present invention to provide for a fuel cell humidifier system which works without separate end plates for the compression of the actual humidifier core.

The object of the present invention is thus solved by an integrated gas management device (GMD), which comprises
(a) a gas-to-gas humidifier core comprising:
the humidifier core defining one or more first gas flow passages and one or more second gas flow passages, the humidifier core having a first end and a second end;
a first gas inlet manifold and a first gas outlet manifold in flow communication with the first gas flow passages;
a second gas inlet manifold and a second gas outlet manifold in flow communication with the second gas flow passages;
wherein the manifolds extend through the humidifier core from the first end to the second end; and
(b) a heat exchanger attached to the first end of the humidifier core, the heat exchanger comprising at least one first gas flow passage and at least one coolant flow passage,
the heat exchanger further comprising a first gas outlet opening through which the at least one first gas flow passage is in flow communication with the first gas inlet manifold of the humidifier core.

This integrated gas management device provides for a particular mechanical rigidity for the compression of the humidifier core and requires only limited packaging space. As it requires no separate tubes or hoses, the integrated GMD shows a reduced number of interfaces and therefore less sealing surface. Overall, this leads to an improved sealing. It is however sometimes advantageous that it integrates the heat exchanger and this way facilitates the heating of the humidifier stack in order to make it operate during very cold starting conditions.

The object of the present invention is also solved by an integrated gas management device (GMD), which comprises
(a) a gas-to-gas humidifier core comprising:
the humidifier core defining one or more first gas flow passages and one or more second gas flow passages, the humidifier core having a first end and a second end;
a first gas inlet manifold and a first gas outlet manifold in flow communication with the first gas flow passages;
a second gas inlet manifold and a second gas outlet manifold in flow communication with the second gas flow passages;
wherein the manifolds extend through the humidifier core from the first end to the second end; and
(b) a water separator attached to the second end of the humidifier core, wherein the water separator has an internal water separation chamber in flow communication with a second gas inlet opening and a second gas outlet opening, and wherein the second gas inlet opening of the water separator is in flow communication with the second gas outlet manifold of the humidifier core.

This embodiment also functions without separate tubing, which is related to a reduced number of interfaces to be sealed, so that the sealing is improved. At the same time, the integrated GMD requires shorter pathways and this way allows for a more compact construction. With this solution, water which accumulates and freezes in the water separator may be easier to thaw due to the improved thermal integration.

The object of the present invention is also solved by an integrated gas management device (GMD), which comprises
(a) a gas-to-gas humidifier core comprising:
the humidifier core defining one or more first gas flow passages and one or more second gas flow passages, the humidifier core having a first end and a second end;
a first gas inlet manifold and a first gas outlet manifold in flow communication with the first gas flow passages;
a second gas inlet manifold and a second gas outlet manifold in flow communication with the second gas flow passages;
wherein the manifolds extend through the humidifier core from the first end to the second end;
(b) a heat exchanger attached to the first end of the humidifier core, the heat exchanger comprising at least one first gas flow passage and at least one coolant flow passage,
the heat exchanger further comprising a first gas outlet opening through which the at least one first gas flow passage is in flow communication with the first gas inlet manifold of the humidifier core; and
(c) a water separator attached to the second end of the humidifier core, wherein the water separator has an internal water separation chamber in flow communication with a second gas inlet opening and a second gas outlet opening, and wherein the second gas inlet opening of the water separator is in flow communication with the second gas outlet manifold of the humidifier core.

This embodiment provides for an excellent mechanical rigidity for the compression of the humidifier core, as the humidifier core is embedded between the heat exchanger and the water separator, at the same time, it allows for a particularly compact construction with extremely short pathways. Given that this integrated GMD also does not require any separate tubing, the number of interfaces is reduced and therefore the sealing is improved. The improved thermal integration at cold start facilitates the thawing of water which has accumulated and frozen in the water separator, in particular as the coolant flow of the entire system can be used to this end.

In an embodiment, the first gas outlet opening of the heat exchanger is aligned and in flow communication with the first gas inlet manifold of the humidifier. This provides for even shorter gas pathways and the sealing is improved, too.

In an embodiment, the second gas inlet opening of the water separator is aligned and in flow communication with the second gas outlet manifold of the humidifier. Here again, the gas pathways are reduced and the sealing is improved.

In an embodiment, the integrated GMD further comprises a thermal isolation plate between the humidifier core and the heat exchanger. In the heat exchanger, intake temperatures of up to 200° C. or even slightly higher occur. The thermal isolation plate prevents overheating of the humidifier. Moreover, the thermal insulation plate avoids a direct contact between the heat exchanger which preferably consists of an aluminum alloy and the humidifier core. These elements have different thermal expansion coefficients and as a consequence extend differently in the direction parallel to the plane of the thermal insulation plate. The thermal insulation plate can balance out these different expansions and this way improves the sealing. As this system does not require additional end plates, the thermal mass of the complete system is reduced and, as a result, the entire system can respond to changes of temperature much more quickly. The typical thickness of this isolation plate, that does not include any gas routing in the plane of the plate, ranges from 0.5 to 20 mm, preferably between 2 to 15 mm.

In an embodiment, the thermal isolation plate is comprised of a plastic material. This is advantageous as it both has less weight as such and less system thermal mass so that the reaction times are reduced. If the humidifier core is also made from plastics, a thermal isolation plate made from plastics can be mounted to the humidifier core by gluing. This results in an improved sealing.

In an embodiment, the thermal isolation plate includes a first gas opening through which flow communication is provided between the first gas outlet opening of the heat exchanger and the first gas inlet manifold of the humidifier. Again, short gas pathways and a very compact construction can be achieved. This embodiment is also related to an excellent sealing.

In an embodiment, the thermal isolation plate closes the first gas outlet manifold, the second gas inlet manifold and the second gas outlet manifold at the first end the humidifier core. This way, the isolation plate forms a selective sealing plate between the humidifier core and the heat exchanger. The gases can directly be guided through the humidifier core so that no additional tubes are required. This is advantageous both with respect to sealing and compaction.

In an embodiment, the integrated GMD further comprises a bypass line having a first end in flow communication with the first gas inlet manifold of the humidifier core and a second end in flow communication with the first gas outlet manifold of the humidifier core. The bypass allows the dry gases to circumvent the humidifier core so that they directly flow into the outlet manifold for dry gas and pass the humidifier core towards the gas stream to the fuel cell stack. In this embodiment, the mixing of humidified gas and dry gas through the bypass line enables one to control the humidity of the gases that are leaving the integrated GMD towards the fuel cell stack. Additionally, the bypass line helps to remove excessive water from the fuel cell stack at shutdown.

In an embodiment, the bypass line is located at the second end of the humidifier core. In this embodiment, the dry air does not enter the humidifier core through the inlet manifold but passes directly through to the dry outlet gas streaming towards the fuel cell stack.

In a different embodiment, the integrated GMD further comprises a thermal isolation plate between the humidifier core and the heat exchanger, wherein the bypass line is integrated with the thermal isolation plate. This embodiment is characterized by a compact construction and a good thermal integration. In this case the typical thickness of the thermal isolation plate is in the range of 10 to 70 mm, preferably between 20 and 50 mm.

In yet another embodiment, the integrated GMD further comprises a bypass line having a first end in flow communication with the first gas inlet manifold of the humidifier core and a second end in flow communication with the first gas outlet manifold of the humidifier core; wherein the bypass line is located at the second end of the humidifier core; and wherein the bypass line is in flow communication with the first gas inlet and outlet manifolds of the humidifier core through passages provided in the water separator, said passages through the water separator being isolated from flow communication with the water separation chamber of the water separator.

In an embodiment, the bypass line is integrated with the water separator. In this way, the integrated GMD includes a reduced number of components, and is therefore very compact.

In an embodiment, the bypass line is integrated with a lid of the water separator. This makes it possible that the lid also closes the bypass line. As it can be moulded without the need for complicated undercuts in the mould, it can be easily and rapidly produced. This embodiment is particularly advantageous if a valve needs to be integrated, as it provides the space required.

In an embodiment, the bypass line is integrated with the heat exchanger. This an alternative approach for a compact construction. It can be realized with short production times, as it allows for the use of metal-forming techniques such as embossment, welding and brazing.

Given the different possibilities for the realization of a bypass line with this integrated GMD, it is possible to respond to the demands and/or requirements of customers.

In an embodiment, the integrated GMD further comprises a bypass valve provided in said bypass line. This allows for active control of the bypass gas stream.

In an embodiment, the water separator has a flat bottom surface through which it is mechanically attached to the second end of the humidifier core. This embodiment is characterized by easy assembly and facilitated manufacturing, and allows for optimized sealing with simple sealing contours. The sealing can also be integrated into the bottom surface of the water separator, this allows for a construction without an isolation plate. Given the flat bottom surface of the water separator, the humidifier core is compressed in a homogenous way.

In an embodiment, the bottom surface of the water separator has four openings, each of which is aligned with one of the manifolds of the humidifier, and one of the four openings comprising the second gas inlet opening of the water separator. On the one hand, this allows for short pathways and therefore for a compact construction. On the other hand, the flow is optimized and the pressure drop is reduced as the openings are flush.

In an embodiment, the water separator further comprises a side wall surrounding the water separation chamber, wherein the second gas outlet opening of the water separator is provided in the side wall, and wherein the side wall is also provided with a drain opening for drainage of liquid water from the water separation chamber, wherein the drain opening communicates with the water separation chamber. This allows for effective drainage of liquid water from the water separation chamber and thus from the wet gas stream exiting the water separation chamber towards the exhaust.

In an embodiment, with the water separator oriented as it would be when installed in a vehicle, the drain opening is located in a lowermost side wall portion of the side wall. This ensures the drainage of liquid water from the water separation chamber as the vehicle is in horizontal orientation.

In an embodiment, the drain opening is located in a lowermost point of the lowermost side wall portion, and wherein an interior surface of the side wall portion is shaped to slope upwardly away from the opening. This ensures the drainage of liquid water from the water separation chamber as the vehicle is in the specified range of normal inclination, while preventing excessive liquid water from flowing backward to the humidifier core or downstream to the exhaust when the vehicle is inclined. This ensures flawless operation of both the humidifier core and all parts, such as a turbine or a pressure control valve that follows the water separation chamber downstream to the exhaust.

In an embodiment, the slope of the side wall portion has an angle relative to a horizontal axis which is greater than a maximum angle of inclination which would be experienced by the vehicle during normal use. This ensures the controlled drainage of liquid water from the water separation chamber as the vehicle is in the specified range of normal inclination of 0 to 20° in all directions.

In an embodiment, the drain opening is located between two of said openings located at opposite corners of the water separator. This provides extra security to drain all liquid water from the gas stream, in case some droplets are carried further to the second outlet of the water separation chamber.

In an embodiment, the drain opening is provided with a valve for selectively opening and closing the drain opening. With this valve, the collected liquid water can be released from the water separation chamber for example on a time based manner or in case the maximum water level is measured by a level sensor in the water separation chamber.

In an alternative embodiment, the drain opening is provided with a passive control of the water drainage from the water separation chamber. Such passive control of the water drainage may comprise a siphon or capillary tube which automatically allows excess water to be drained from the water separation chamber.

In an embodiment, the drain opening is located in close proximity to one of said openings. This allows for effective drainage of the liquid water close to the openings.

In an embodiment, the side wall further comprises a second gas inlet opening in flow communication with the second gas inlet manifold and a first gas outlet opening in flow communication with the first gas outlet manifold. These openings allow the gases to be guided from the inlet and outlet manifolds of the humidifier core to parts adjacent to the water separation chamber on the side distant to the humidifier core. This makes the gas routing very compact.

In an embodiment, the water separator comprises a coolant flow passage which is in flow communication with the at least one coolant flow passage of the heat exchanger. This allows for controlled temperature in the water separation chamber. With this feature it is possible to use the coolant flow to thaw any ice during cold start that was formed in the water separation chamber during cold storage of the vehicle.

In an embodiment, the alternating first gas flow passages and second gas flow passages of the humidifier core are separated by membranes which are permeable to water vapor.

In an embodiment, the heat exchanger is mechanically attached to the humidifier. This can be realized by screws, bolts, a clamp band or gluing, depending on the given installation situation and the forces required to compress the humidifier core.

In an embodiment, the humidifier core is compressed between the heat exchanger and the water separator. This allows for very compact setup of the humidifier as the mechanical stability and rigidity of the heat exchanger and the water separator is used instead of additional bulky end plates.

In an embodiment, the humidifier core is a humidifier stack comprising a stack of humidifier plates separated by moisture-permeable membranes, which is an efficient setup of a plate-style humidifier with flat membranes.

In an embodiment, the humidifier core comprises a bundle of tubes, each of the tubes having a tube wall comprising a water permeable membrane. Therefore, the humidifier may have an alternative structure, comprising a tube-style humidifier with hollow fibre membranes.

In an embodiment, the integrated GMD further comprises an anode gas heater for heating a hydrogen-containing reductant gas stream. This allows for a compact and efficient integration of the anode heat exchanger, as the excess heat from the air heat exchanger can directly be used to heat the anode gas stream.

In an embodiment, the anode gas heater is integrated with the heat exchanger, and wherein the heat exchanger is a three-fluid heat exchanger which further comprises at least one reductant gas flow passage. This allows for a very compact and cost efficient integration of the anode heat exchanger as the three-fluid heat exchanger can be produced in the same way as a standard two-fluid heat exchanger with only minimal extra cost.

In an embodiment, the integrated GMD further comprises a cathode gas cooler for cooling an oxygen-containing oxidant gas stream with a cathode exhaust gas; wherein the cathode gas cooler is integrated with the heat exchanger, and wherein the heat exchanger is a three-fluid heat exchanger which further comprises at least one gas flow passage for the cathode exhaust gas. This allows for additional thermal integration of the complete cathode gas balance of plant. Thus the excessive heat from the cathode compressor can be dumped into the cathode exhaust stream. This raises the temperature level of the exhaust stream, preventing the flow of liquid water towards parts located downstream of the exhaust, such as a turbine or a pressure control valve. Additionally, this prevents the loading of large amounts of heat into the coolant loop of the vehicle.

BRIEF DESCRIPTION OF THE DRAWINGS

The invention will now be described, by way of example only, with reference to the accompanying drawings, in which:

FIG. 7 is an exploded perspective view showing the individual components of an integrated device according to a second embodiment of the invention;

FIG. 8 is an exploded view showing the possible structure of a humidifier plate for an integrated device according to the invention;

FIG. 9 is a perspective view showing an end plate with an integrated bypass line and valve;

FIG. 10 is a perspective view showing another end plate with an integrated bypass line and valve.

DETAILED DESCRIPTION

In the following description, extensive reference is made to a "first gas" and a "second gas". In embodiments where the description relates to an integrated gas management device (GMD) for processing an oxidant gas stream for the cathode of a fuel cell system, it will be understood that the "first gas" is an oxidant gas containing molecular oxygen, typically comprising ambient air. In this case, where the first gas is an oxidant gas, the GMD is sometimes referred to herein as an "air management device", or "AMD". Where ambient air is used as the oxidant gas, it is compressed to a pressure above ambient pressure, for example up to about 2 bar, in an air compressor. The oxidant gas has a relatively low water content and may, for example, have a dew point of about −25° C.

In embodiments where the description relates to an integrated GMD for processing a reductant gas stream for the anode of a fuel cell system, it will be understood that the "first gas" is a reductant gas containing molecular hydrogen. In this case, where the first gas is a reductant gas, the GMD is sometimes referred to herein as a "hydrogen management device" or "HMD".

In some embodiments of the invention, discussed below, the GMD incorporates components which perform processing functions on both the oxidant and reductant gas streams. For example, the GMD may include separate or integrated means for heat exchange in one or both of the oxidant and reductant gas streams. For example, the GMD may include a combined heat exchanger comprising a section for heat exchange in the oxidant gas and a section for heat exchange in the reductant gas.

It will also be understood that the "second gas" is the exhaust gas of the fuel cell cathode, comprising air which has been reacted in the fuel cell, and which has a reduced oxygen content and a relatively high content of water vapour, since oxygen is consumed and water is produced by the chemical reaction in the fuel cell. For example, the cathode exhaust may have a dew point of more than about 30° C., in most cases more than about 70° C.

The following description concentrates on embodiments where the GMD is an AMD, the primary purpose of which is to process cathode charge air in a fuel cell system, and wherein the "first gas" is an oxidant gas containing molecular oxygen, and the "second gas" is the exhaust gas of the fuel cell cathode. An integrated AMD 10 according to an embodiment of the invention is now described below.

Figure 1:
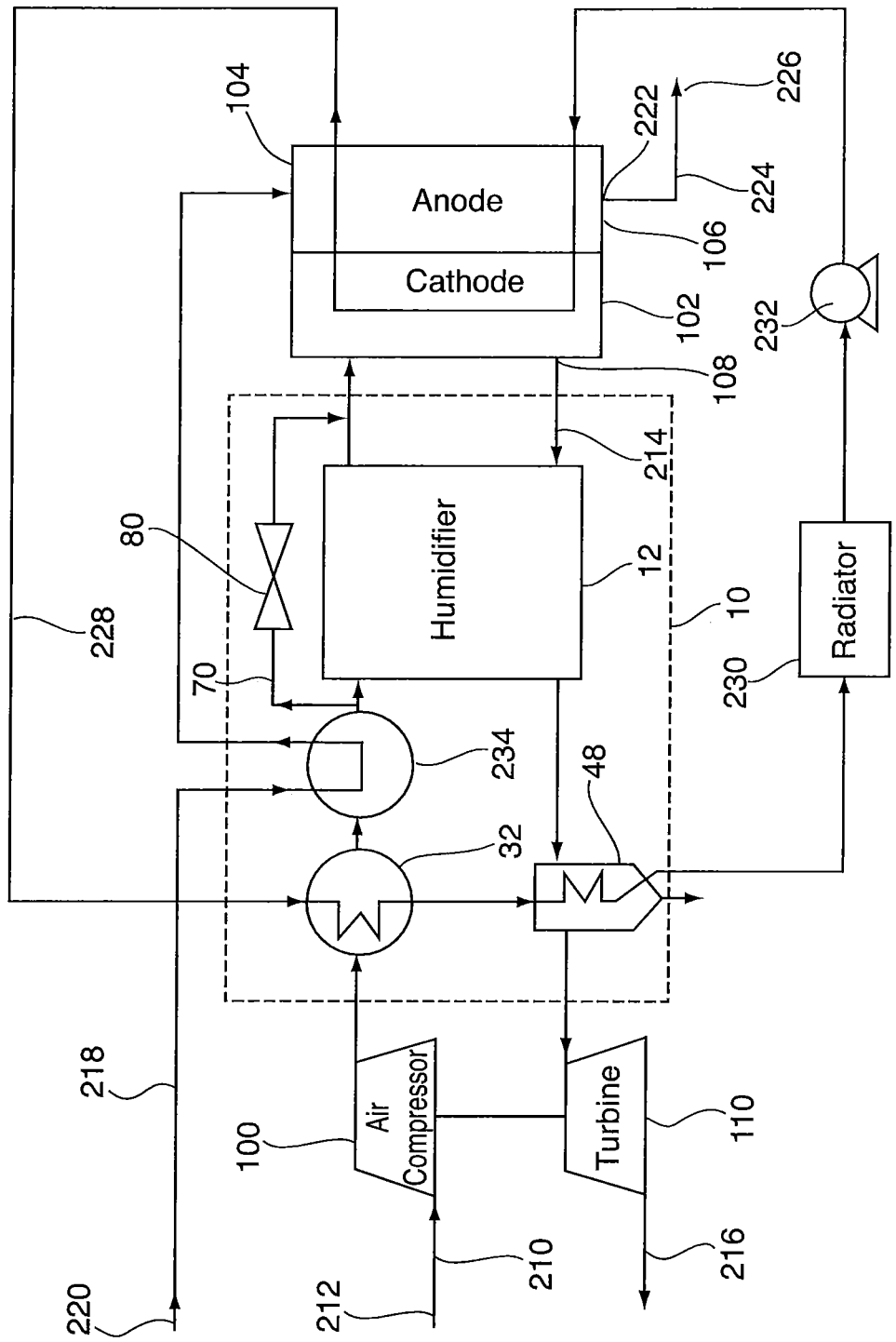
FIG. 1 is a schematic diagram showing the components of a fuel cell gas management device according to a first embodiment of the invention.

FIG. 1 is a schematic diagram showing a number of components of a fuel cell system, and the components within the area enclosed by dotted lines represent the components which may be integrated in AMD 10. On the input side, an oxidant gas, which here comprises ambient air, flows through a cathode air input line 210 from a source of ambient air 212 to the cathode 102 of the fuel cell stack 104, where it is reacted with a reductant gas containing hydrogen. AMD 10 is located downstream of the air compressor 100, which receives cathode air from air inlet 212, and upstream of the cathode 102.

On the exhaust side, the spent oxidant gas reacted in fuel cell stack 104 is exhausted from an exhaust port 108 of the cathode 102 and flows through a cathode exhaust line 214 to an exhaust outlet 216 of the fuel cell system. AMD 10 is located downstream of the exhaust port 108 of the cathode 102, and upstream of the exhaust outlet 216. Optionally, the AMD 10 is located upstream of a turbine 110 which may drive the compressor 100. Alternatively, the AMD 10 may be located upstream of a pressure regulating valve (not shown), or the cathode exhaust gas may flow directly from the AMD 10 to the exhaust outlet 216.

While AMD 10 primarily functions to process cathode charge air, FIG. 1 shows that AMD 10 may optionally integrate at least one component involved in supplying the reductant gas to the fuel cell stack 104. This option is illustrated in FIG. 1, which shows that the reductant gas containing molecular hydrogen flows through a hydrogen input line 218 from a hydrogen source 220 to the anode 106 of the fuel cell stack 104, where it is reacted with the oxidant gas. The spent reductant gas reacted in fuel cell stack 104 is exhausted from an exhaust port 222 of the anode 106 and flows through an anode exhaust line 224 to an exhaust outlet 226 of the fuel cell system. As shown in FIG. 1, AMD 10 is located in the hydrogen input line 218, downstream of the hydrogen source 220 and upstream of the anode 106.

The AMD 10 and the fuel cell stack 104 may be integrated into the coolant circulation system of the fuel cell system. In this regard, FIG. 1 shows a coolant circulation line 228 through which a liquid coolant is circulated through the fuel cell stack 104 and through AMD 10. As shown, AMD 10 may be located downstream of fuel cell stack 104 in the coolant circulation system, such that AMD 10 receives coolant through line 228 after it passes through the fuel cell stack 104. Once the coolant passes through AMD 10, it may flow through line 228 to be cooled in radiator 230, and then pass through coolant pump 232 on its way back to the fuel cell stack 104. It will be appreciated that the radiator 230 may include a fan, and that a bypass line and bypass valve may be provided to permit the coolant to bypass the radiator 230 under certain operating conditions, such as during cold starting conditions.

Figure 1A:
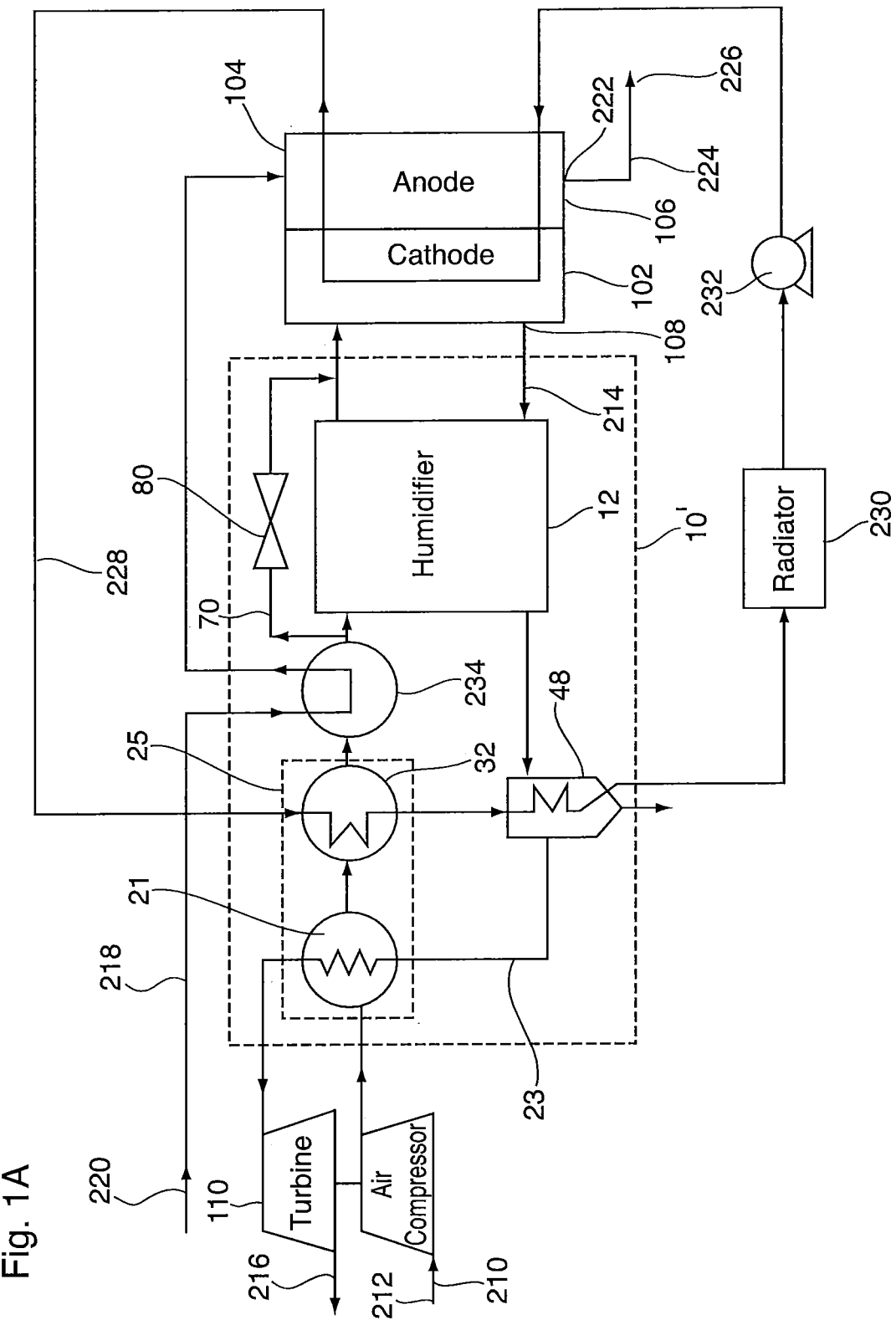
FIG. 1A is a schematic diagram showing the components of a fuel cell gas management device according to a second embodiment of the invention.

It can be seen from FIG. 1 that several components of the fuel cell system are combined in AMD 10, and these components are described in detail below. The function of the integrated AMD 10 is to cool and optionally humidify the compressed charge air from the compressor 100 before it reaches the intake port of the cathode 102, and to remove and optionally recover water from the cathode exhaust. Optionally, as discussed below, AMD 10 may also include means for heating the reductant gas. As shown in the schematic drawings of FIGS. 1 and 1A, and in the perspective views of FIGS. 2 and 3, the integrated AMD 10 comprises a gas-to-gas humidifier core 12 (also referred to herein as humidifier stack 12), a heat exchanger 32, a water separator 48, a bypass line 70 with a bypass valve 80. FIGS. 1 and 1A show that the coolant passing through AMD 10 is circulated through heat exchanger 32. Optionally, as shown in FIGS. 1 and 1A, the coolant may be circulated through the water separator 48 to melt frozen water during cold starting of the fuel cell, as further discussed below. Also, as shown in FIGS. 1 and 1A, but not shown in the other drawings, AMD 10 may further include a reductant gas heat exchanger 234, described further below.

FIG. 1A is a schematic diagram showing a number of components of a fuel cell system, and the components within the area enclosed by dotted lines represent the components which may be integrated in AMD 10', which is a slightly modified version of AMD 10 described above. Like components of AMD 10' are identified by like reference numerals, and the above description of these components applies equally to AMD 10. The description of these elements will not be repeated below. Rather, the following discussion will focus on the differences between AMD 10 and AMD 10'.

AMD 10' includes all the elements of AMD 10, and further integrates a cathode gas cooler 21, which may comprise a gas-to-gas charge air cooler which receives hot charge air from air compressor 100, and cools the hot charge, air with a relatively cool gas stream. In the illustrated embodiment, the cool gas stream comprises cathode exhaust exhausted from cathode 102 through exhaust outlet 108, and passed through humidifier stack 12 and water separator 48. A conduit 23 delivers the cathode exhaust from water separator to the gas-to-gas charge air cooler 21. After being discharged from the cathode gas cooler 21, the heated cathode exhaust may be used to drive turbine 110.

The cathode gas cooler 21 may be integrated into the heat exchanger 32, in which case the heat exchanger 32 will comprise a three-fluid heat exchanger, as indicated by dotted line 25 in FIG. 1A. This helps to reduce the number of components of the fuel cell system, and therefore helps to save space and reduce costs. An example of such an integrated three-fluid heat exchanger is described in commonly assigned U.S. patent application Ser. No. 13/777,626, filed on Feb. 26, 2013, and published on Aug. 29, 2013 as US 2013/0224613 A1.

Figure 2:
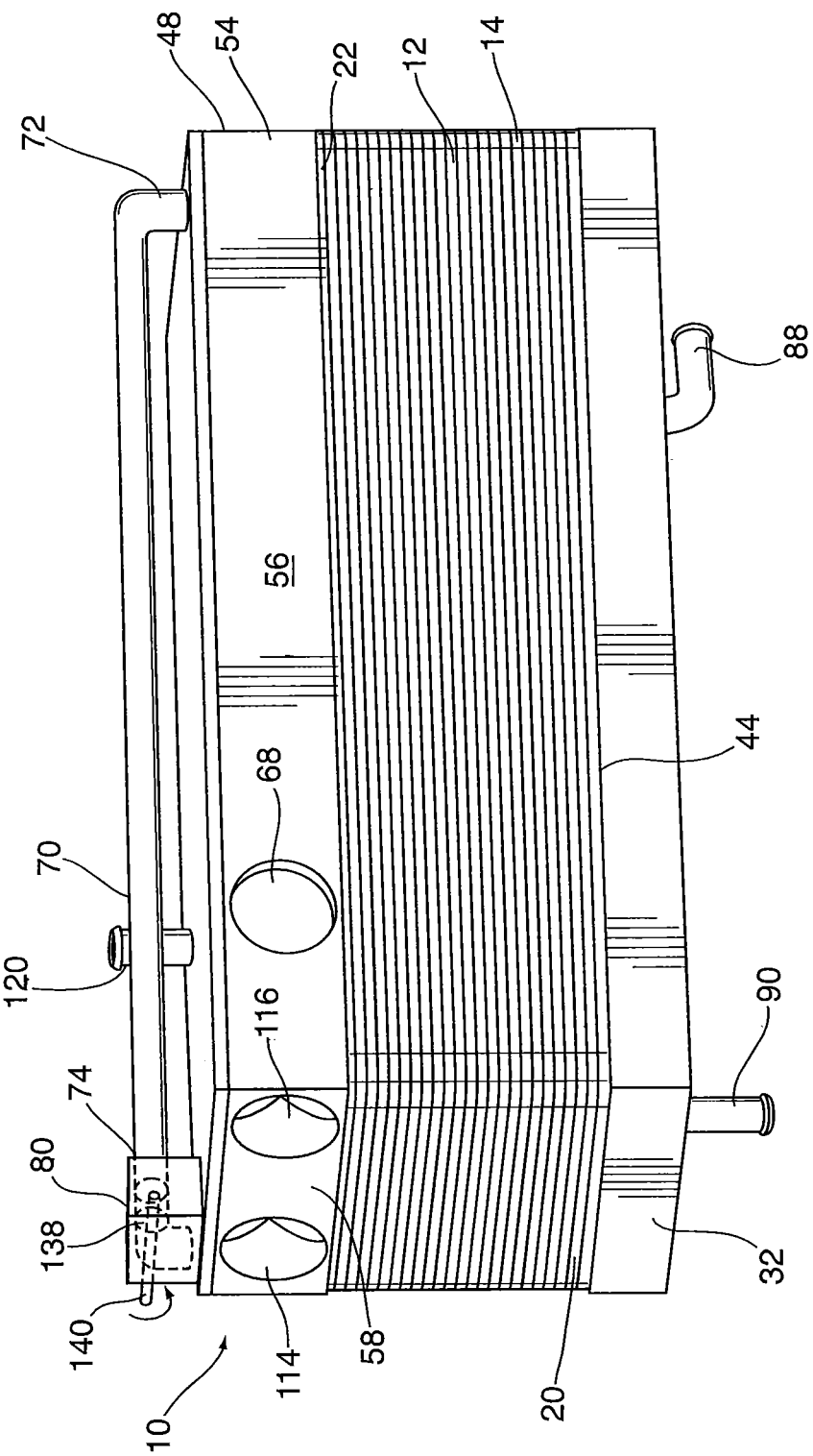
FIG. 2 is a first perspective view of an integrated device according to an embodiment of the invention.

The humidifier stack 12 comprises a stack of humidifier plates 14 defining alternating first gas flow passages 16 and second gas flow passages 18, as is shown in FIG. 8. FIG. 2 illustrates the stacking of humidifier plates 14 in the stack 12, although not to scale. Furthermore, for convenience, the other drawings showing the humidifier stack 12 do not illustrate the individual plates 14. The humidifier plates 14 and humidifier stack 12 may have a structure as described in Vanderwees '712, and FIG. 8 shows an example of a wet or a dry humidifier plate 14 according to Vanderwees '712. Each plate 14 defines a first (dry) gas flow passage 16 or a second (wet) gas flow passage 18, with adjacent plates 14 being separated by membranes (not shown) which are permeable to water vapour, and layer(s) of diffusion media (not shown). The humidifier plates 14 are thin and flexible, and are typically constructed of plastic or corrosion-stable metal and are provided with a compressible sealing material 142 close to their edges such that the plates 14 and membranes 86 of stack 12 are sealed to one another by compression. The compression may be provided by mechanical fasteners such as bolts or spokes (not shown) passed through holes 144 in the stack of plates 14 and extending from one end to another of the stack 12, or flexible bands or straps (not shown) wrapped around the outside of stack 12. The illustrated plate 14 is for a counterflow humidifier stack 12, and the manifolds of the stack 12 are shown in FIG. 8. In an alternative arrangement, the plates 14 of humidifier stack may be adhesively joined and sealed together.

Although the drawings illustrate a membrane humidifier having a core comprising a stack of plates 14, it will be appreciated that the humidifier of AMD 10 is not necessarily a membrane humidifier, nor is it necessary that the humidifier core be constructed from a stack of plates 14. Therefore, reference numeral 12 is used herein to designate a humidifier stack 12, or to more generally designate a humidifier core which may be of any suitable construction. For example, the humidifier core 12 may instead comprise a bundle of tubes enclosed within a housing, with manifold spaces being provided at the ends of the tube bundle, the manifold spaces communicating with openings in the heat exchanger 32 and the water separator 48. In such a humidifier, each of the tube walls comprises a water permeable membrane such that moisture can be exchanged between a gas flowing through the tubes and a gas flowing over the outer surfaces of the tubes.

Figure 4:
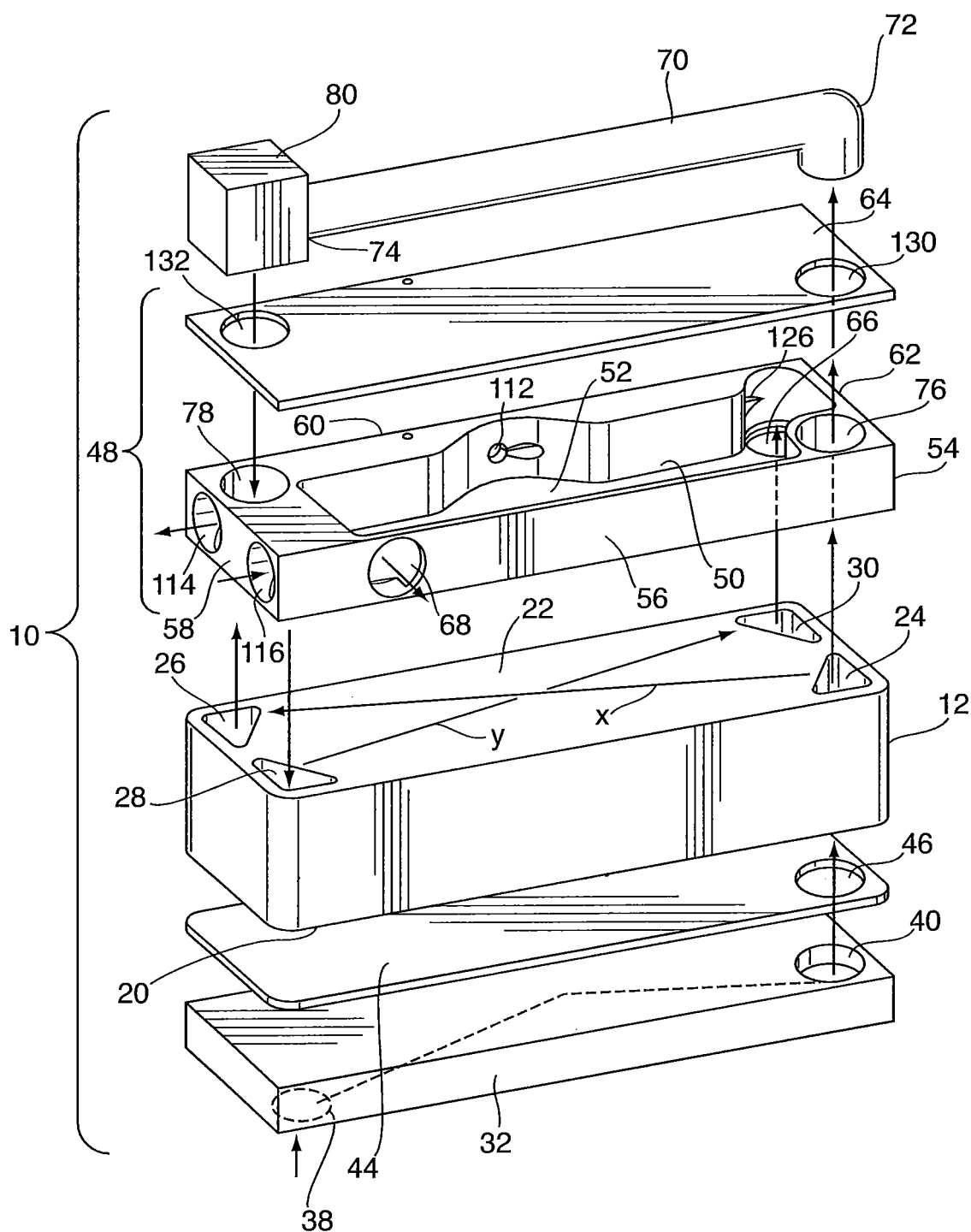
FIG. 4 is an exploded perspective view showing the individual components of the device of FIGS. 2 and 3.

The humidifier stack 12 has a first end 20, shown at the bottom of the stack 12 in FIG. 4, and a second end 22, located at the top of stack 12 in FIG. 4. The humidifier stack 12 also includes a plurality of inlet and outlet manifolds which are in flow communication with the gas flow passages 16 and 18 defined by the plates 14 of stack 12. In particular, the humidifier stack 12 includes a first gas inlet manifold 24 and a first gas outlet manifold 26 which are in flow communication with the first gas flow passages 16. As can be seen from FIG. 4, the first gas inlet and outlet manifolds 24, 26 are located at diagonally opposite corners of the humidifier stack 12, and therefore the first gas traverses the first gas flow passages 16 along a diagonal flow path in the direction of arrow X.

The humidifier stack 12 also includes a second gas inlet manifold 28 and a second gas outlet manifold 30, which are in the flow communication with the second gas flow passages 18 defined by humidifier plates 14. The second gas inlet and outlet manifolds 28, 30 are also located at diagonally opposite corners of the humidifier stack 12, and therefore the second gas traverses the second gas flow passages 18 along a diagonal flow path in the direction of arrow Y. This direction of flow is advantageous because when AMD 10 is installed in a fuel cell system, it will be oriented with the second gas inlet manifold 28 situated above the second gas outlet manifold 30. Therefore, any liquid water which separates from the second gas stream inside humidifier stack 12 will flow downwardly toward outlet manifold 30 by gravity.

It can also be seen from arrows X and Y of FIG. 4 that the first and second gases will flow in generally opposite directions, and therefore the humidifier stack 12 is configured for counter-flow of the two gas streams. It will be appreciated, however, that the humidifier stack 12 may instead be configured for co-flow or cross-flow of the gases.

The manifolds 24, 26, 28, 30 extend through the humidifier stack 12 from the first end 20 to the second end 22. In the illustrated embodiment, the manifolds extend vertically between the first end 20 and the second end 22, with the first and second ends of the manifolds being open.

The heat exchanger 32 is attached to or incorporated into the first end 20 of humidifier stack 12 and has generally the same outer shape and dimensions as the humidifier stack 12. Therefore, heat exchanger 32 also has the form and function of a thick structural end plate, similar to end plate 72 or 173 described in Vanderwees '712. The heat exchanger 32 may have any desired structure, and comprises at least one first gas flow passage and at least one coolant flow passage. For example, the heat exchanger 32 may comprise a stack of plate pairs defining a plurality of alternating gas flow passages and coolant flow passages, and may comprise a rigid, brazed assembly comprised of these plate pairs. The rigidity of heat exchanger 32 therefore provides the humidifier stack 12 with structural rigidity which would otherwise be provided by the thick structural end plates of a conventional humidifier, and permits the structural end plate to be omitted. This helps to reduce cost and save space. It will be appreciated that the structure of the heat exchanger 32 can be varied from that which is described herein without departing from the invention. Therefore, the structure of heat exchanger 32 is only schematically illustrated in the drawings.

Figure 3:
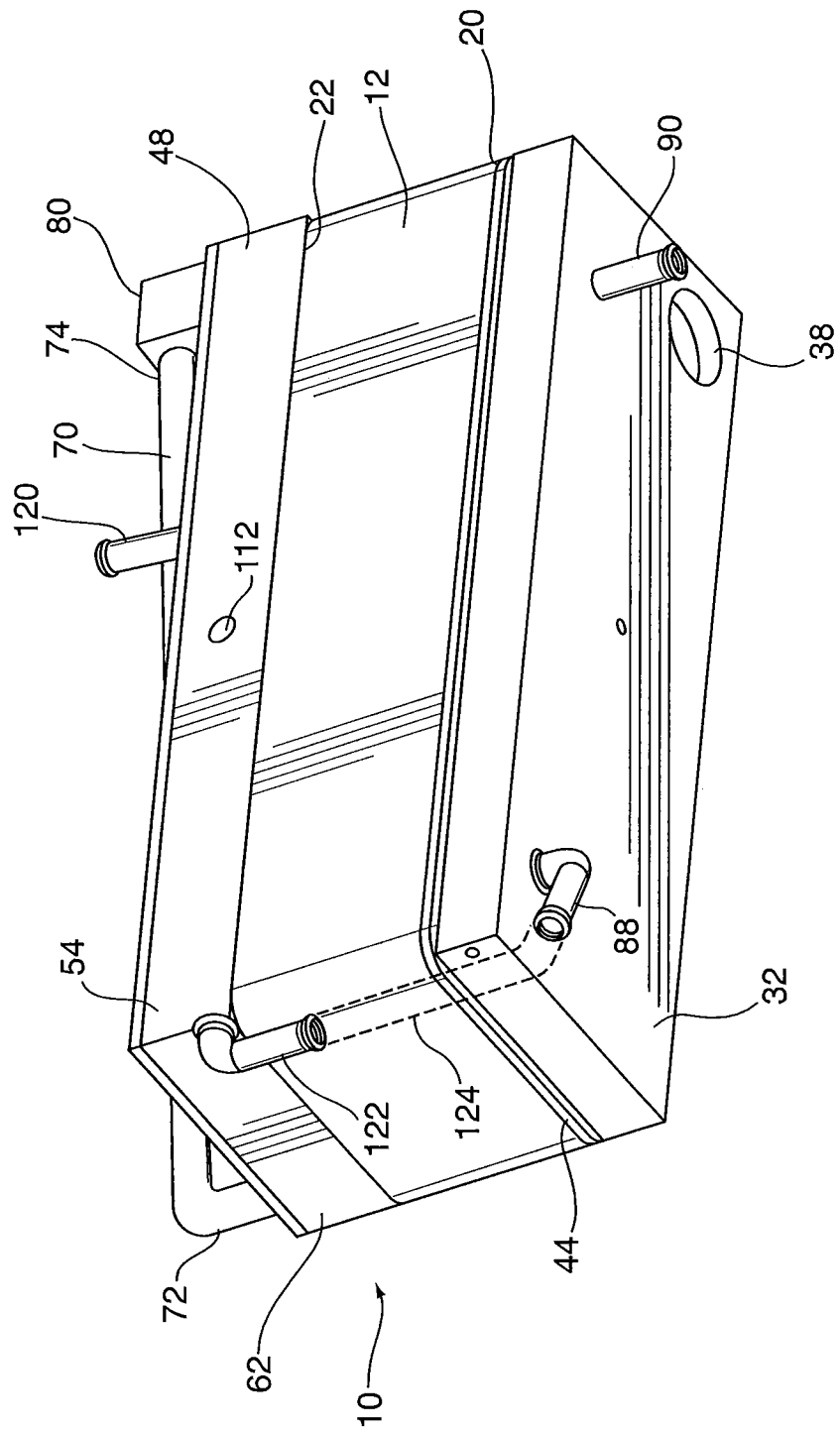
FIG. 3 is a second perspective view of an integrated device according to FIG. 2.

As shown in FIG. 3, the surface of heat exchanger 32 which faces away from humidifier stack 12 (referred to herein as the "distal surface") is provided with coolant fittings 88 and 90, which are in flow communication with the at least one coolant flow passage of heat exchanger 32. Each of the coolant fittings 88, 90 may be an inlet fitting or outlet fitting, depending on the direction of coolant flow through the heat exchanger 32. Also shown on the distal surface of heat exchanger 32 is a first gas inlet opening 38 through which the first gas enters the integrated AMD 10 and, depending on the structure of the heat exchanger 32, may comprise a first gas inlet manifold. For example, the first gas inlet opening 38 may receive hot, pressurized charge air directly from the air compressor 100.

As shown in FIG. 4, the surface of heat exchanger 32 which faces toward the humidifier stack 12 (referred to herein as the "proximal surface") is provided with a first gas outlet opening 40 through which the at least one first gas flow passage is in sealed flow communication with the first gas inlet manifold 24 of the humidifier stack 12. Depending on the structure of the heat exchanger 32, the first gas outlet opening 40 may comprise a first gas outlet manifold. As can be seen from FIG. 4, the first gas outlet opening 40 may be aligned with the first gas inlet manifold 24 of the humidifier stack 12, and is therefore located at a corresponding corner of the heat exchanger 32.

As shown, the first gas inlet and outlet openings 38, 40 may be located at opposite ends of the heat exchanger 32, such that the first gas flow passage extends throughout substantially the entire length of the heat exchanger 32. Similarly, the coolant fittings 88, 90 are located at opposite ends of the heat exchanger 32, such that the coolant traverses the coolant flow passage in counter-flow or co-flow with the first gas flowing through the first gas flow passages, depending on the direction of coolant flow.

As shown in FIG. 1, AMD 10 may include a reductant gas heater 234, which is located in the cathode air input line 210 and in the hydrogen input line 218. In some embodiments the reductant gas heater 234 may comprise a gas-to-gas heat exchanger which is physically separate from heat exchanger 32. In this case, excess heat retained by the first gas after it passes through heat exchanger 32 will be transferred to the reductant gas in the reductant gas heater 234. The anode gas heater 234 may be located downstream of heat exchanger 32 in the cathode air input line 210 as shown in FIG. 1, although this is not essential. Rather, the anode gas heater 234 could be located upstream of heat exchanger 32.

In the embodiment of FIG. 1, the reductant gas heater 234 may be physically integrated into heat exchanger 32. In this case, heat exchanger 32 would comprise a three-fluid heat exchanger including one or more first gas flow passages (for the oxidizing gas), one or more coolant flow passages, and one or more reductant gas flow passages. In such a construction, heat would be transferred to the reductant gas by either the first gas, the coolant, or both, depending on the arrangement of the flow passages within the three-fluid heat exchanger 32.

In the embodiment of FIG. 1A, one or both of the reductant gas heater 234 and the cathode gas cooler 21 may be physically integrated into the heat exchanger 32, or all three heat exchangers 21, 32 and 234 may be integrated with each other. Accordingly, the functions of heat exchangers 21, 32 and 234 can be performed by three two-fluid heat exchangers, one four-fluid heat exchanger, or a two-fluid heat exchanger and a three-fluid heat exchanger.

Where the humidifier stack 12 is constructed in accordance with Vanderwees '712, it will be constructed of a compressed stack of thin, flexible, plastic plates 14 separated by water vapor-permeable membranes. In contrast, the heat exchanger 32 will typically be of brazed construction, and will be comprised of aluminum or an aluminum alloy. Because the heat exchanger 32 is in contact with hot charge air, it will be at a temperature which is greater than the operating temperature of the humidifier stack 12. Therefore, in order to prevent damage to the humidifier stack 12, it is desirable to reduce the amount of heat which is conducted from the heat exchanger 32 to the humidifier stack 12. Therefore, the AMD 10 may include a flat thermal isolation plate 44 which is located between the heat exchanger 32 and the humidifier stack 12. The thermal isolation plate 44 is typically comprised of a plastic material and has a first gas opening 46 through which flow communication is provided between the first gas outlet opening 40 of heat exchanger 32 and the first gas inlet manifold 24 of the humidifier stack 12. For example, as shown in the drawings, the opening 46 of thermal isolation plate 44 may be located at a corner, in alignment with the first gas outlet opening 40 of heat exchanger 32 and the first gas inlet manifold 24 the humidifier stack 12. The typical thickness of thermal isolation plate 44 ranges from 0.5 to 20 mm, for example from 2 to 15 mm.

Rather than comprising a separate component, it will be appreciated that the thermal isolation plate 44 may comprise a polymeric base plate of the heat exchanger 32, for example having a structure similar to the polymeric gasket carrier plate described in International Publication No. WO 2012/104077 A1, which is incorporated herein by reference in its entirety.

Because the thermal isolation plate 44 has only one opening 46 in the present embodiment, it closes and seals the first ends (i.e. the lower ends in FIG. 4) of the first gas outlet manifold 26, the second gas inlet manifold 28 and the second gas outlet manifold 30 of the humidifier stack 12. Also, the plate 44 provides a flat sealing surface against which the humidifier stack 12 is compressed. Good and homogeneous compression, and thus secure sealing of the openings or manifolds of the heat exchanger 32 and the humidifier stack 12, is more difficult to achieve where the stack 12 is compressed against an end plate of a brazed heat exchanger. Thus, the thermal isolation plate 44 provides thermal insulation and helps to improve sealing and compression of the humidifier stack 12, and also contributes to overall rigidity of the AMD 10.

It will be appreciated that the thermal isolation plate 44 is not required in all embodiments of the invention. For example, it will be appreciated that the coolant flowing through heat exchanger 32 will be at a significantly lower temperature than the first gas stream under normal operating conditions. Therefore, it may be possible to provide adequate thermal isolation of humidifier stack 12 by constructing the heat exchanger 32 such that the first channel or flow passage of the heat exchanger 32, immediately adjacent to the humidifier stack 12, is a coolant flow passage. Where a thermal isolation plate 44 is not required for thermal isolation of the humidifier stack 12, it will be appreciated that the heat exchanger 32 may be provided with a flat base plate for good sealing and compression with the humidifier stack 12. For example, the base plate may be machined from aluminum or an aluminum alloy.

Even in embodiments where a thermal isolation plate 44 is present, it may be desired to construct the heat exchanger 32 such that the first channel or flow passage is a coolant flow passage, for additional thermal protection.

As shown in FIG. 4, the water separator 48 is attached to the second end 22 of humidifier stack 12, and has generally the same outer shape and dimensions as the humidifier stack 12. Therefore, water separator 48 also has the form and function of a thick end plate of the humidifier stack 12, as in Vanderwees '712. The water separator 48 has a rigid structure which provides the humidifier stack 12 with the structural rigidity which would otherwise be provided by the thick structural end plate of a conventional humidifier, and thereby permits the structural end plate to be omitted. As a result, the humidifier stack 12 may be compressed between the heat exchanger 32 and water separator 48 in the same manner that the core of the humidifier in Vanderwees '712 is compressed between thick end plates 72, 173. The elimination of the structural end plates for humidifier stack 12 brings about additional cost and space savings by reducing the number of components making up AMD 10, and permitting more of the packaging space to be allotted to the humidifier stack 12. It will be appreciated that some of these benefits will also be realized where only one of the heat exchanger 32 or the water separator 48 is integrated with the humidifier stack 12. In this case, one end of humidifier stack 12 would be provided with the heat exchanger 32 or the water separator 48, while the other end of stack 12 would be provided with a structural end plate 72 or 173 as described in Vanderwees '712.

The water separator 48 comprises an internal water separation chamber 50, which is enclosed by a bottom wall 52, a side wall 54 and a lid 64. In the illustrated embodiment, the bottom wall 52 and side wall 54 are integrally formed, and the lid 64 is separately formed, although this is not necessary. In the embodiment shown in the drawings, where the humidifier stack 12 has a rectangular shape, the water separator 48 has a corresponding rectangular shape, and therefore the side wall 54 is made up of four sidewall portions, labeled 56, 58, 60 and 62 in the drawings. The walls 52, 54 and lid 64 of water separator 48 are formed from rigid plastic material to provide the AMD 10 with added stiffness, which provides better compression and sealing of the plates 14 and membranes within the humidifier stack 12. To provide the required mechanical stiffness necessary to achieve adequate, homogeneous compression of the humidifier stack 12, additional ribs may be provided in wall 52 and/or lid 64, and/or additional support structures can be provided between wall 52 and lid 64 to strengthen the structure of the water separator 48.

Figure 5:
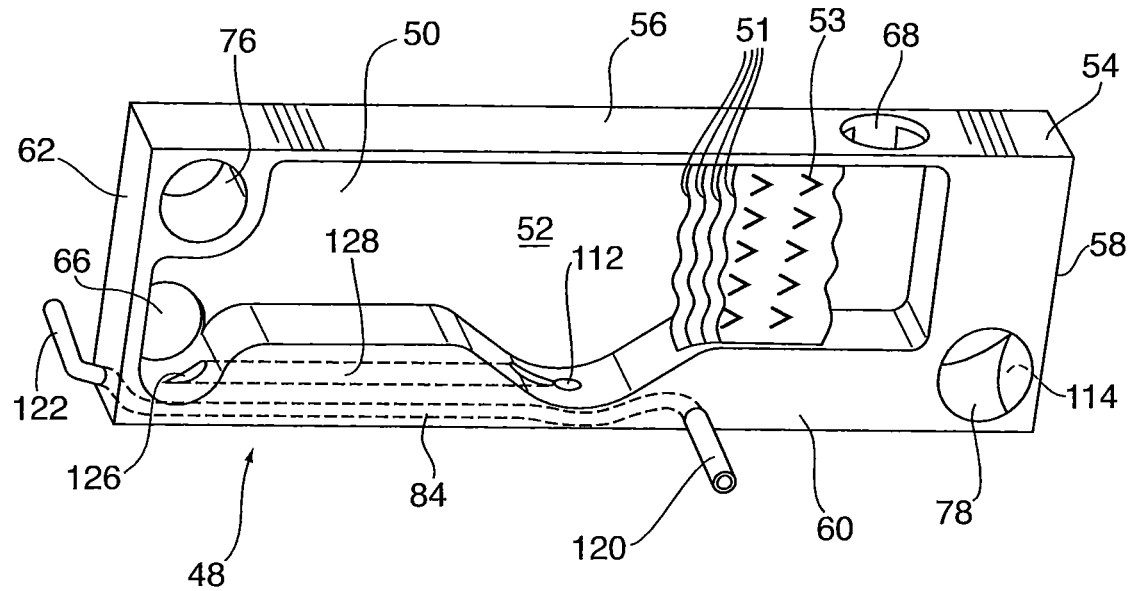
FIG. 5 is a top perspective view of the body of the water separator in the device of FIGS. 2 and 3.

The water separation chamber 50 may be filled with a material which will assist in separating liquid water from the second gas stream. This material may take a variety of forms, including open cell metal or plastic foam or fabrics, one or more layers of metal or plastic fin or turbulizer, or other air-liquid separator structures, which may be stacked, rolled or otherwise installed to fill the chamber 50. For example, FIG. 5 shows a portion of water separation chamber 50 in which a stack of air-liquid separator elements 51 is provided in the chamber 50. FIG. 5 shows the separator elements 51 provided in a portion of the chamber 50, however, it will be appreciated that the separator elements 51 may fill substantially the entire volume of chamber 50 between the openings 68 and 66.

Each separator element 51 comprises a sheet or plate having a plurality of enhancements 53 in the form of triangular tabs, projections or protuberances that are raised out of the plane of the separator element 51, and which are also referred to herein as delta wing tabs or protrusions. Such delta wing tabs are described in U.S. Provisional Application No. 61/840,159 filed on Jun. 27, 2013. The delta wing tabs 53 of adjacent layers of separator elements 51 may be arranged in a number of ways. For example, the delta wing tabs 53 of adjacent separator elements 51 may be arranged in-line with one another, or they may be staggered and/or nested. Some possible arrangements are illustrated in FIGS. 6-15 of above-mentioned U.S. Provisional Application No. 61/840,159.

In the illustrated embodiment, the delta wing tabs 53 are arranged in spaced relation to one another on each of the separator elements 51, and the separator elements 51 are arranged in a stack. Alternatively, the stack may be formed by stacking individual plates or by rolling a larger sheet into a plurality of layers. Where the separator elements 51 are individual plates arranged in a stack, the plates may be provided with locating dimples such as those shown in FIG. 27 of U.S. Provisional Application No. 61/840,159, or other suitable locating structures. In addition, delta wing tabs 53 may be provided on the bottom wall 52 of water separator 48, or on the inner surface of lid 64 and/or the inner surfaces of side wall 54.

The material for assisting in separating liquid water may alternatively comprise a tubular separator, such as those disclosed in U.S. Pat. No. 7,785,401 to Wagner et al., which is incorporated herein by reference in its entirety. A drain hole 112 is provided in the side wall 54 of the water separator 50, and will be provided in the side wall portion 60 which faces downward during operation of AMD 10 (e.g. in the orientation shown in FIG. 5), to permit gravity drainage of condensate from the chamber 50. As shown, the drain hole 112 is located in a lowermost point of sidewall portion 60, which causes the drain hole 112 to be lower than surrounding portions of side wall portion 60, thereby improving drainage of liquid water toward the drain hole 112. The smoothly shaped sloping of the inner surface of side wall portion 60 toward drain hole 112 also promotes water drainage.

It can also be seen from FIG. 5 that the second gas inlet opening 66 of water separator 48 is located close to a corner of the water separator 48, and is located along the side wall portion 60 in alignment with the second gas outlet manifold 30 of the humidifier stack 12. Furthermore, the second gas inlet opening 66 is located in a lower portion of the water separation chamber 50, with the inner surface of side wall portion 60 sloping toward opening 66, so that liquid water from the water separation chamber 50 may be encouraged to flow toward second gas inlet opening 66. However, it is undesirable to allow water to collect in this area as it can enter the manifold 30 of humidifier stack 12. Therefore, a second drain hole 126 is provided in the side wall portion 60 in the vicinity of second gas flow opening 66. Drain hole 126 may extend through the side wall portion 60 to the exterior of the water separator 48. However, in the illustrated embodiment, the second drain hole 126 is connected to the drain hole 112 through an internal water channel 128 passing through the side wall portion 60, such that liquid water collected by the second drain hole 126 is discharged from the water separator 48 through the drain opening 112.

For the sake of convenience, the side wall 54 of water separator 48 is shown as being relatively thick around some portions of its perimeter, and relatively thin around other portions of its perimeter. In order to improve manufacturability and reduce weight, it will be appreciated that the thicker areas of water separator 48 may be reduced in thickness and/or hollowed out such that the side wall 54 may be of relatively constant thickness about its perimeter, while maintaining sufficient rigidity as discussed above.

Figure 5B:
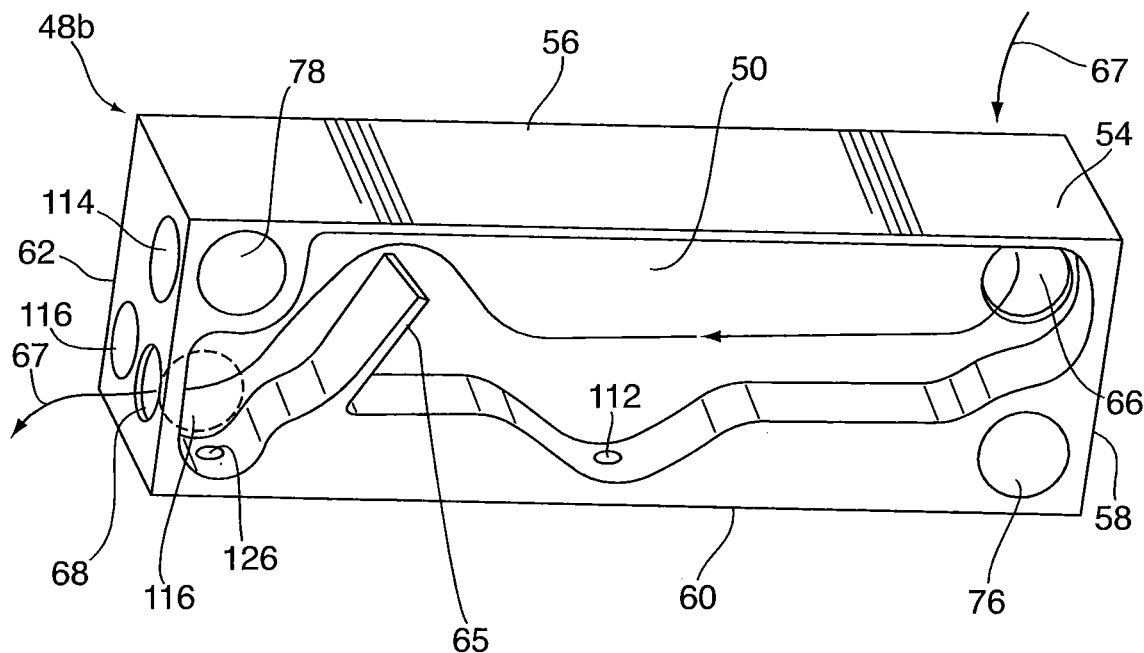
FIG. 5b is a top perspective view of the body of an alternate water separator in the device of FIGS. 2 and 3.
Figure 5C:
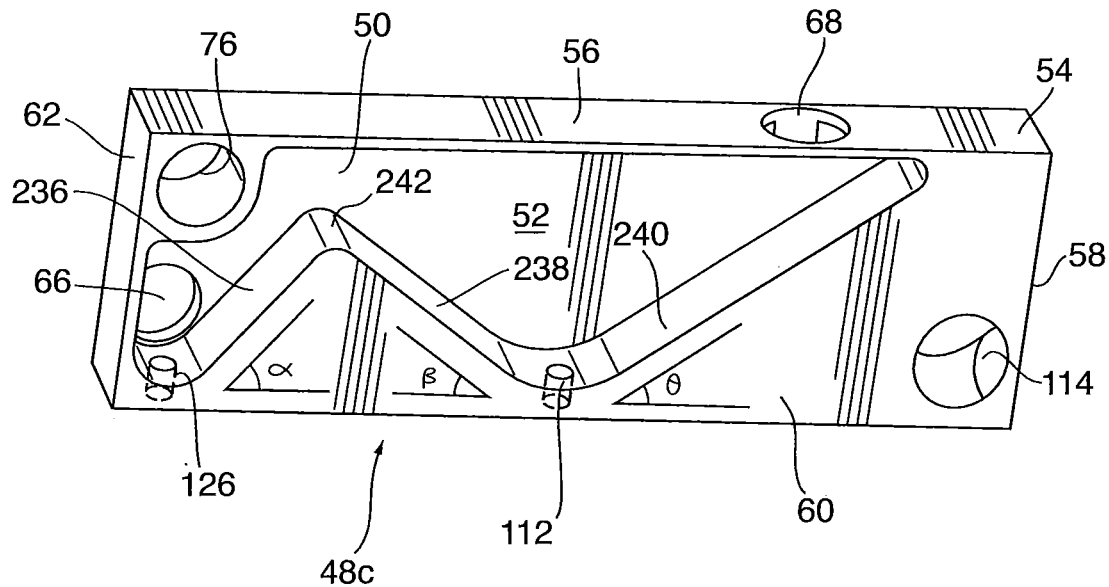
FIG. 5c is a top perspective view of the body of another alternate water separator in the device of FIGS. 2 and 3.

FIGS. 5b and 5c illustrate alternate constructions for the water separator, and are now discussed below. The water separators shown in FIGS. 5b and 5c are similar to water separator 48 described above. Therefore, unless otherwise stated, the description of the elements of water separator 48 applies equally to the water separators of FIGS. 5b and 5c. Also, in the drawings and in the following description, like elements of the water separators are identified by like reference numerals.

In the water separator 48b shown in FIG. 5b, the second gas stream flows through the water separator 48b in the opposite direction relative to water separator 48. In FIG. 5b, the locations of openings 66 and 68 are reversed, such that the second gas enters the second gas inlet opening 66 at the upper right corner of water separator 48b, and flows from right to left, exiting the water separator 48b through second gas outlet opening 68, at the lower left corner of water separator 48b. The direction of flow of the second gas stream through water separator 48b is indicated by the arrow 67 in FIG. 5b.

The locations of first and second bypass openings 76, 78 in water separator 48b may be the same as in water separator 48, or they may be reversed as shown in FIG. 5b so as to maintain counterflow with the second gas stream.

In the embodiment of FIG. 5b, a baffle 65 is provided inside the water separation chamber 50, in front of opening 68, to prevent droplets of liquid water entrained in the second gas stream from exiting the water separator 48 and entering a component, such as a turbine, located immediately downstream of the AMD 10. In this embodiment, drain openings 112 and 126 extend through the side wall portion 60 and permit gravity drainage of water from the water separation chamber 50.

In water separator 48b, the first gas outlet opening 114 and the second gas inlet opening 116 are provided in portion 2 of side wall 54. Both of these openings 114, 116 communicate with respective manifolds 26, 28 of the humidifier. As indicated by dotted lines in FIG. 5b, the second gas inlet opening 116 does not communicate with the water separation chamber 50. However, as it is desirable to avoid any buildup of liquid water in the manifold 28, which will be located at the bottom in the configuration of FIG. 5b, it may be desired to provide a drain hole (not shown) through the area enclosed by dotted lines in FIG. 5b, so as to permit liquid water to flow from the manifold 28 and enter the drain hole 126.

FIG. 5c illustrates a water separator 48c according to a further embodiment of the invention. According to this embodiment, the interior surfaces of the sidewall 54 are shaped to provide more effective drainage of liquid water from the internal condensation chamber 50 of water separator 48c. In this regard, the orientation of water separator 48c, as shown in FIG. 5c, corresponds to the orientation of water separator 48c when installed in a vehicle and/or when in use. That is, the side wall portion 60 in which drain holes 112 and 126 are provided will be the lowermost side wall portion and will face downwardly with the water separator 48c in this orientation, allowing liquid water to drain from chamber 50 by gravity. For this reason, the side wall portion 60 is shaped so that liquid water will flow toward openings 112, 126 regardless of any inclination of the vehicle in which the water separator 48c is installed. Therefore, openings 112, 126 are located in the lowermost points of the side wall portion 60, and the interior surfaces of side wall portion 60 are shaped so as to slope upwardly away from the openings 126. The angles $\alpha, \beta, \theta$ of the sloped portions 236, 238, 240 of side wall portion 60, measured relative to a horizontal axis (represented for example by the exterior surface of side wall portion 60), may be from about 15-45 degrees, for example about 20-40 degrees, and are greater than a maximum angle of inclination which would be experienced by the vehicle during normal use.

At a point 242 where sloped portions 236, 238 meet, the side wall portion 60 is gently curved. Also side wall portions 60 and 58 blend smoothly together into sloped portion 240, avoiding any vertical or horizontal surfaces which might affect drainage of liquid water.

Figure 5D:
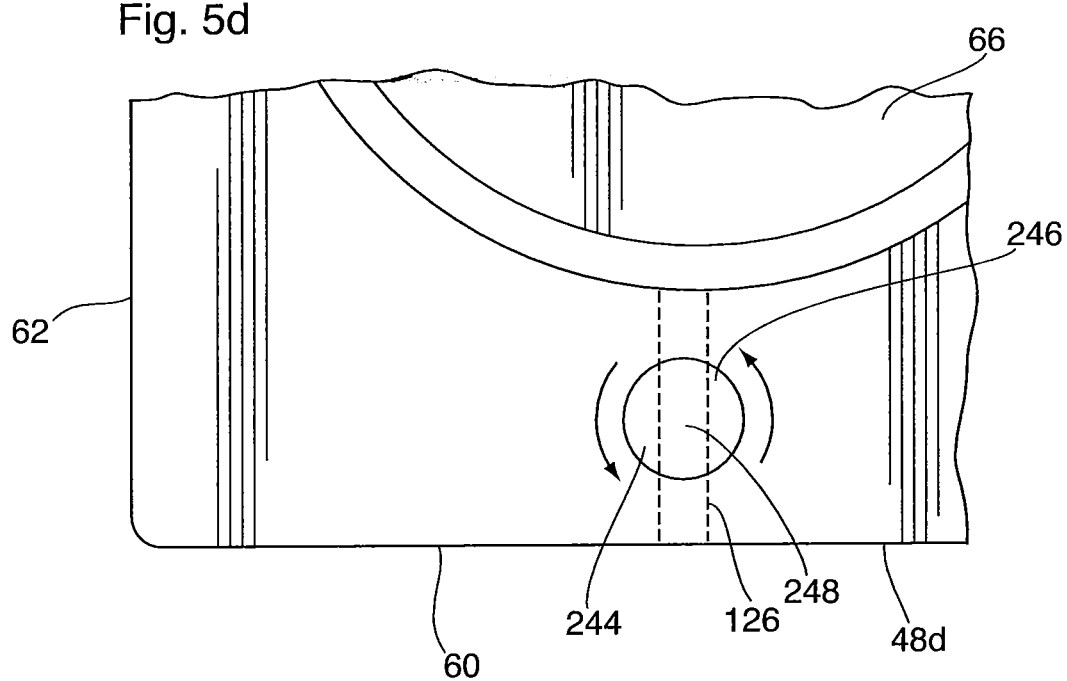
FIG. 5d is a partial top plan view of the body of an alternate water separator in the device of FIGS. 2 and 3.
Figure 6:
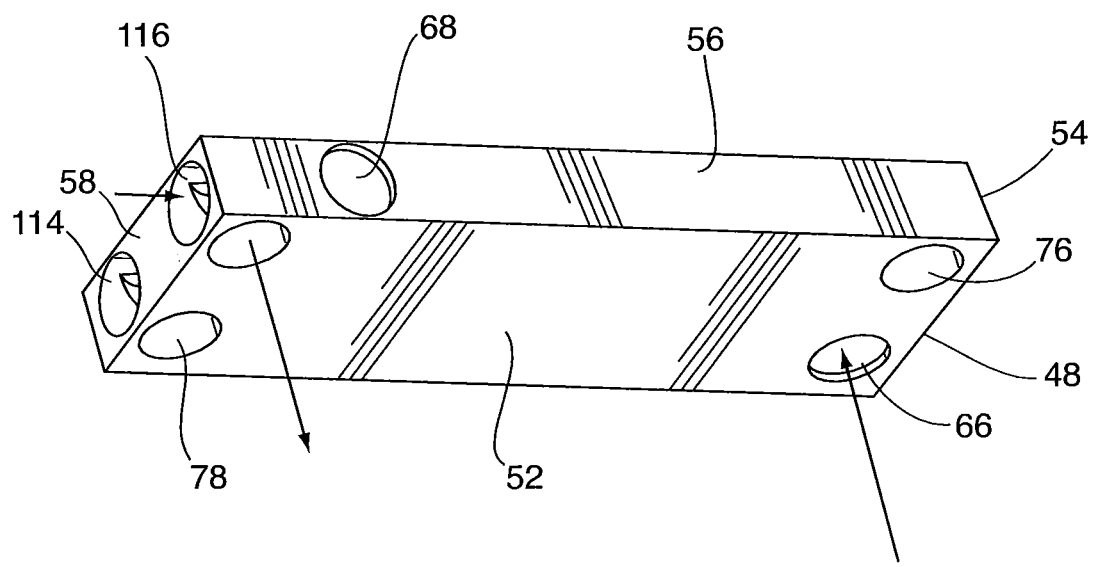
FIG. 6 is a bottom perspective view of the body of the water separator in the device of FIGS. 2 and 3.

In the water separator 48c of FIG. 5c, the drainage openings 112, 126 are open at all times. This is not necessarily the case. For example, FIG. 5d illustrates a portion of a water separator 48d according to another embodiment of the invention in which opening 126 is in the form of a cylindrical channel between the interior and exterior surfaces of side wall portion 60, in the vicinity of opening 66. The opening 126 is selectively opened and closed by a valve 244 which is located between the ends of the cylindrical channel. The valve 244 may comprise a cylindrical valve element 246 having a flow passage 248 which aligns with and forms part of opening 126 when the valve 244 is open, as shown in FIG. 5d. The valve 244 is closed by rotating the valve element 246 as indicated by the curved arrows in FIG. 5d by an amount sufficient to move the flow passage 248 out of alignment with the opening 126.

The valve 244 may be kept closed until liquid water collects at the bottom of opening 66. To operate valve 244, a sensor (not shown) may be provided in the lowermost point of sidewall portion 60 in which opening 126 is provided. When the sensor senses the presence of liquid water in this area, it sends a signal to a controller (not shown) which opens the valve 244 for a period of time sufficient to drain the water through the opening 126. The valve 244 may either be provided in the side wall portion 60, as shown in FIG. 5d, or may be located externally of the water separator 48d. A similar arrangement could also be provided for opening 112.

In an alternative embodiment, the drain opening 126 may be provided with a passive control of the water drainage from the water separation chamber 50. Such a passive control of the water drainage may comprise a siphon or capillary tube (not shown) which automatically allows excess water to be drained from the water separation chamber 50.

Under cold conditions, there may be some freezing of liquid water within the water separator 48, particularly in the areas surrounding drain holes 112, 126, along the side wall portion 60. For this reason, the water separator 48 may also include an internal coolant flow passage 84 (FIG. 5) extending lengthwise through the side wall portion 60 of side wall 54 between a pair of coolant fittings 120 and 122, which are best seen in FIG. 3. The internal coolant flow passage 84 passes in close proximity to the drain holes 112,126 and the internal water channel 128. This permits the water separator 48 to be actively warmed by coolant within the system cooling loop, so as to melt any ice which collects along the side wall portion 60, and keep the drain holes 112, 126 open. As also shown in FIG. 3, the coolant fitting 122 of water separator 48 may be connected to the coolant fitting 88 of the heat exchanger 32 through a tube or hose 124 extending along an end of AMD 10. Alternatively, the water separator can be electrically warmed to melt ice in chamber 50. This coolant passage 84 passing through water separator 48 is also schematically shown in FIGS. 1 and 1A.

Instead of the external tube or hose 124 described above, the device 10 may be provided with an internal coolant passage through the humidifier stack 12. For example, a sealed passage may be formed by aligned openings in the humidifier plates 14, optionally with a tube inserted into the aligned openings.

The water separator 48 includes a second gas inlet opening 66 and a second gas outlet opening 68, both of which are in flow communication with the internal water separation chamber 50. The second gas inlet opening 66 is formed in the bottom wall 52 of water separator 48 and is in flow communication and alignment with the second gas outlet manifold 30 of the humidifier stack 12. The second gas outlet opening 68 is formed in the side wall 54 of water separator 48 and provides an outlet through which the second gas stream exits the AMD 10 toward the exhaust outlet of the vehicle. Therefore, in operation, the water separator 48 receives the second gas stream directly from the outlet side of the humidifier stack 12, with the second gas stream flowing through the second gas inlet opening 66, through the water separation chamber 50, and finally through the second gas outlet opening 68 to exit the AMD 10.

The water separator 48 is also provided with a number of openings which are not directly related to the removal of condensate from the second gas stream, and which permit the water separator to serve as a manifold for the flow of the first gas stream. These openings include a first gas outlet opening 114 in the side wall 54, an outer second gas inlet opening 116 in the side wall 54 (see also FIG. 6), the first bypass opening 76, and the second bypass opening 78. The function of these additional openings will be explained below.

Although not shown in the drawings, the humidifier stack 12, heat exchanger 32, thermal isolation plate 44, and water separator 48 are joined together by mechanical means to form an integrated, rigid structure. For example, these components may be provided with external apertured flanges or with internal holes for mechanical fasteners such as bolts, in the manner described in Vanderwees '712. Alternatively, the components of AMD 10 may be held together by straps which may be comprised of metal, plastics, carbon fibers, or combinations thereof.

To allow for thermal expansion and contraction, as well as for settling due to the creeping of the materials used in the humidifier stack 12, while maintaining sufficient compression and rigidity of the integrated structure, the mechanical fasteners or straps may be equipped with elastic elements such as springs, disc springs, or the like. It is also possible to include elastic components or areas within the straps. The elastic elements help to maintain a constant compressive force on the humidifier stack 12 over the lifetime of the AMD 10, thus providing secure sealing between all layers and components of the AMD 10, while maintaining compression of humidifier stack 12 and rigidity of the AMD 10.

Furthermore, where the heat exchanger 32 has a thermal isolation plate 44 or a polymeric base plate as described in above-mentioned International Publication No. WO 2012/104077, the plate may be provided with an apertured flange through which the heat exchanger 32 is joined to the humidifier stack 12 and water separator 48. It will be appreciated that mechanical connection of the components further reduces heat conduction between the components making up AMD 10, particularly between the heat exchanger 32 and the humidifier stack 12.

Under certain operating conditions it is desirable for the first gas stream to bypass the humidifier stack 12. As shown in FIG. 1, this results in the first gas stream flowing directly from the heat exchanger 32 to the cathode 102 of fuel cell stack 104. To provide a further cost and space savings and a reduction in the number of components in the overall system, the bypass is also incorporated into AMD 10. In this regard, AMD 10 further comprises a bypass line 70 having a first end 72 in flow communication with the first gas inlet manifold 24 of humidifier stack 12 and a second end 74 in flow communication with the first gas outlet manifold 26 of the humidifier stack 12.

In addition, as shown in the drawings, the second end 74 of bypass line 70 and the first gas outlet manifold 26, are both in flow communication with the first gas outlet opening 114 in the side wall 54 of water separator 48. Therefore, according to this arrangement, the first gas stream exits the AMD 10 through the first gas outlet opening 114 whether it bypasses the humidifier stack 12 or flows through the first gas flow passages 16 of humidifier stack 12. Thus, the moisture level in the first gas stream flowing toward the fuel cell stack 104 can be adjusted or varied in accordance with specific operating conditions using a bypass valve 80. For example, it may be desired to have the cathode air bypass the humidifier 12 when the fuel cell stack 104 is cold, for example on start-up, so as to avoid condensation of water in the gas flow passages of the stack 104. Also, it may be desired to employ the bypass during stack shut-down to help purge water from the stack 104 and avoid water freezing in the stack 104.

The flow of the first gas through the bypass line 70 is controlled by bypass valve 80 which is located in the bypass line 70. The valve 80 may be electronically controlled by one or more sensors, measuring the humidity of the first gas stream entering the AMD 10. The bypass valve 80 may take a variety of forms, and permits the water content of the first gas stream to be adjusted and optimized as it flows toward the cathode 102. In its closed position the valve 80 blocks the bypass line 70, and in its open position the valve 80 permits flow of the first gas stream through the bypass line, and predominantly circumventing the humidifier stack 12. Furthermore, where the bypass valve 80 is a proportional valve, the AMD 10 can achieve different mixing ratios of humidified and dry portions of the first gas stream, to provide well controlled humidification of the first gas stream fed to the fuel cell stack 104.

The valve 80 shown in FIG. 2 comprises a butterfly type valve having a rotatable valve member 138 pivotably mounted on its central axis to a valve rod 140 which is rotatable about an axis which is transverse to the gas flow direction through the bypass line 70. An end of rod 140 may protrude through the valve housing to engage an actuation mechanism (not shown). In FIG. 2 the valve 80 is shown in the closed position, with the valve member 138 blocking the bypass line 70. Rotation of the valve member 138 by 90 degrees in either direction will completely open the bypass line 70 to permit bypass flow of the first gas stream. It will be appreciated that the valve 80 is not necessarily a butterfly valve, but may be any type of valve, such as a ball valve, a flap valve, cylindrical valve or sliding valve.

In the embodiment shown in FIG. 2, the valve 80 is located at a second end 74 of the bypass line 70. It will be appreciated, however, that the location of valve 80 can be varied. For example, the valve 80 may be located at the first end 72 of the bypass line 70 or at any point between the first and second ends 72, 74. Alternatively, the valve 80 may be incorporated into the body of the water separator 48, for example inside opening 76 or 78 of water separator 48.

With the bypass valve 80 open, the first gas flows through bypass line 70 directly from the first gas inlet manifold 24 in the direction of the first gas outlet manifold 26 of the humidifier stack 12, from where it exits the AMD 10 through first gas outlet opening 114, with only a small amount of the first gas flowing through the first gas flow passages 16 of the humidifier stack 12. Accordingly, the bypass line 70 effectively permits the first gas to bypass the humidifier stack 12 and flow directly from the heat exchanger 32 to the cathode 102 of fuel cell stack 104 without being humidified.

With the bypass valve 80 closed, the first gas enters the first gas inlet manifold 24, flows through gas flow passages 16 where it is humidified by the second gas, enters the first gas outlet manifold 26 and then exits the AMD 10 through the first gas outlet opening 114.

In the embodiment shown in FIGS. 1 to 5, the bypass line 70 is provided on the water separator 48 side of the AMD 10, at the second end 22 of humidifier stack 12. Because the water separator 48 functions as an end plate, it completely covers the second end 22 of the humidifier stack 12. Therefore, the first end 72 of bypass line 70 is in flow communication with the first gas inlet manifold 24 of the humidifier stack 12 through the first bypass opening 76 of water separator 48 and opening 130 formed in lid 64, and the second end 74 of bypass line 70 is similarly in flow communication with the first gas outlet manifold 26 through the second bypass opening 78 of water separator 48 and the opening 132 in lid 64, which is also in flow communication with the first gas outlet opening 114 in the side wall 54 of water separator 48. The bypass openings 76, 78 thereby provide passages through the body of water separator 48 and are isolated from flow communication with the water separation chamber 50 of the water separator 48.

Rather than providing the bypass line 70 at the water separator 48 side of AMD 10, it will be appreciated that the bypass line 70 may instead be provided at the heat exchanger 32 side of the AMD. An integrated air management device (AMD) 200 according to a second embodiment of the invention is now described below with reference to the exploded view of FIG. 7, in which like components are identified with like reference numerals.

In the AMD 200 shown in FIG. 7, the humidifier stack 12 is identical to that of AMD 10 described above. The bypass line 70 and bypass valve 80 are also identical to those described above, except that they are located at the opposite end of the AMD 200. In the embodiment of FIG. 7, with the bypass valve open, the first end 72 of the bypass line 70 receives the first gas stream directly from the first gas outlet opening 40 of the heat exchanger 32, wherein the first gas outlet opening 40 is open on both sides of the heat exchanger 32 and may comprise a manifold communicating with a plurality of said first gas flow passages. The flow passes through the bypass line 70 to the second end 74, where the bypass line 70 is in flow communication with the first gas outlet manifold 26 of the humidifier stack 12. Where the heat exchanger 32 and the thermal isolation plate 44 cover substantially the entire first end 20 of the humidifier stack 12, both the heat exchanger 32 and the thermal isolation plate 44 are provided with through passages 134 and 136, respectively, to permit flow communication between bypass line 70 and first gas outlet manifold 26. It will be appreciated that the through passage 134 of heat exchanger 32 does not communicate with the at least one first gas flow passage or the at least one coolant flow passage of the heat exchanger 32. Once the first gas passes through the first gas outlet manifold 26 of the humidifier stack 12, it exits the AMD 10 through the first gas outlet opening 114 in the direction of the cathode 102 of the fuel cell stack 104.

It will be appreciated that the bypass line 70 may be integrated into the structure of the water separator 48, for example into a thickened sidewall 54 or lid 64 of the water separator 48, into a thickened end plate of the heat exchanger 32, or into the thermal isolation plate 44 between the heat exchanger 32 and the humidifier stack 12, the plate including the routing of the gas stream and an integrated bypass valve 80. Various examples of components of AMD 10 which may have an integrated bypass line 70 are now described below with reference to FIGS. 9 to 11, in which like reference elements are identified by like reference numerals.

FIG. 9 illustrates an embodiment of an end plate 150 which may be sealed to either end of an AMD according to the invention, either being sealed to the distal surface of the heat exchanger 38 in the manner of bypass line 70 of FIG. 7, or comprising the lid of water separator 48, replacing lid 64 of water separator 48 shown in FIG. 4. The end plate 150 includes a lower surface which includes openings 130, 132. The opening 130 is located at the first end 72 of a bypass line 70, while the opening 132 is located at the second end of 74 of bypass line 70. A bypass valve 80 is located in the bypass line 70 between the first and second ends 72, 74, and may optionally comprise a butterfly valve comprising a rotatable valve member 138 pivotably mounted to a valve rod 140, at least one end of which may protrude from a surface of end plate 150.

Where the end plate 150 replaces the lid 64 of water separator 48, the opening 130 will be located so as to be in flow communication with opening 76 of water separator 48, and the opening 132 will be located so as to be in flow communication with opening 78 of water separator 48. Where the end plate 150 is sealed to the distal surface of the heat exchanger 32, the opening 130 will be located so as to be in flow communication with the opening 40 of heat exchanger 32, while the opening 132 will be located so as to be in flow communication with the opening 134 of heat exchanger 32.

FIG. 10 illustrates a slightly different end plate 152, which shares many of the same elements as end plate 150. The above description of these elements applies equally to end plate 152, and will not be repeated. The following description focuses only on the differences between end plate 152 and end plate 150.

Rather than butterfly bypass valve 80, end plate 152 comprises a bypass valve 80 having a cylindrical valve element 154 received in a cylindrical recess 156 of end plate 152, and having a central passage 158 which can be rotated into and out of alignment with the bypass line 70, as indicated by the double-ended arrow in FIG. 10.

Figure 11:
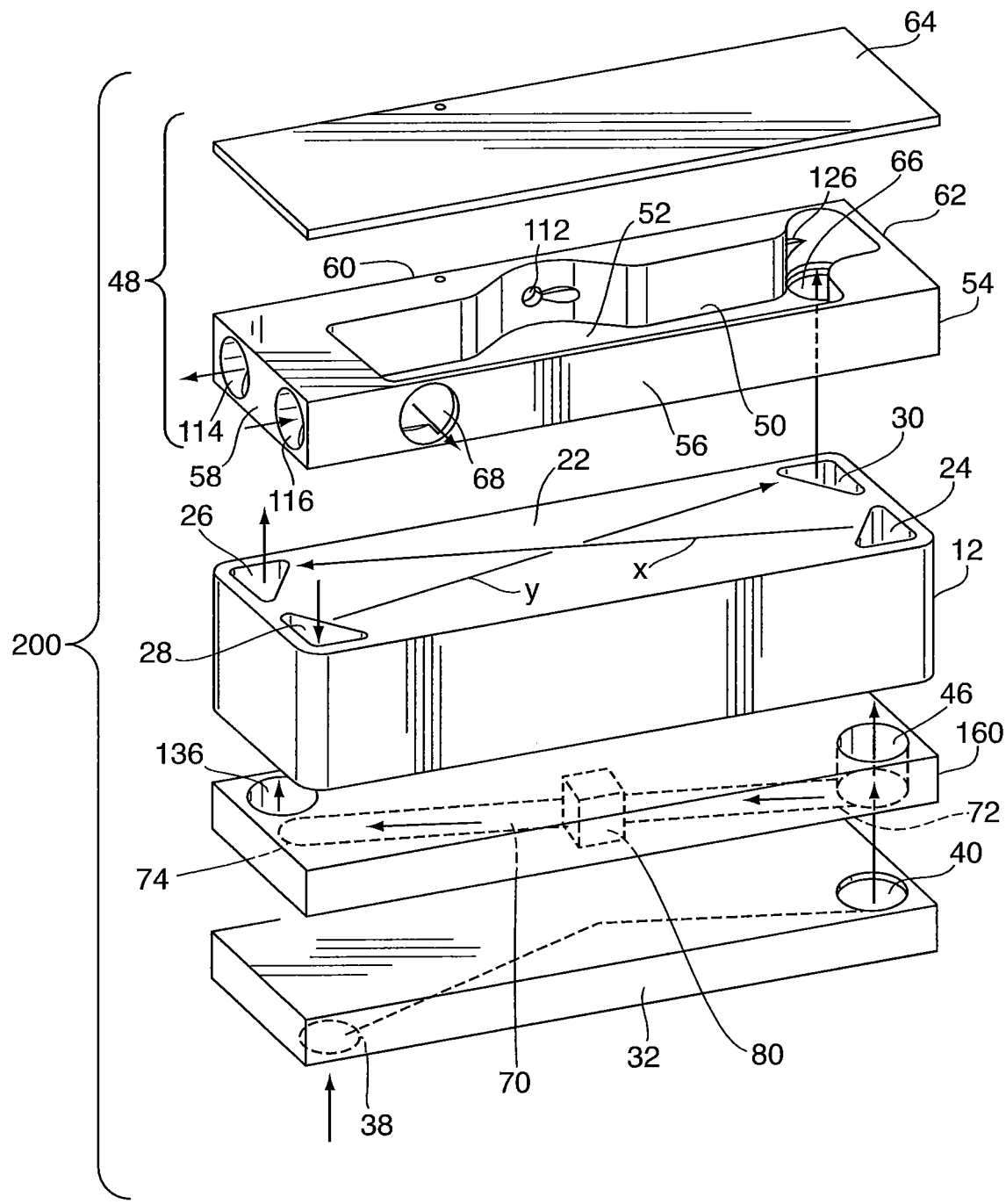
FIG. 11 is an exploded perspective view showing the individual components of an integrated device according to a third embodiment of the invention.

FIG. 11 illustrates yet another possibility for integrating the bypass line 70 into a component of an AMD according to the invention. In this embodiment, the bypass line 70 is integrated into the thermal isolation plate 160 located between the humidifier stack 12 and the heat exchanger 32. The plate 160 in FIG. 11 is thicker than the plate 44 of AMD 10, in order to enclose the bypass line 70. The typical thickness of plate 160 is in the range of 10 to 70 mm, for example between 20 and 50 mm. This increased thickness of plate 160 may provide additional advantages in terms of thermal isolation. The structure of thermal isolation plate 160 in FIG. 11 is similar to that of end plates 150, 152 described above. In this regard, the plate 160 includes first and second openings 46 and 136 extending therethrough, as in thermal isolation plate 44 of FIG. 7. However, in the thermal isolation plate 160, the first opening 46 is in flow communication with the first end 72 of the bypass line 70 and the second opening 136 is in flow communication with the second end 74 of the bypass line, the bypass line 70 being completely enclosed within the thermal isolation plate 160. The bypass valve 80 of thermal isolation plate 160 is generally shown as being located between the first and second ends 72, 74 of the bypass line 70. The valve 80 may have any configuration described herein, and is also enclosed within the thermal isolation plate 160.

As with the thermal isolation plate 40 of FIG. 7, the first opening 46 of thermal isolation plate 160 is in flow communication with opening 40 of heat exchanger 32 and the first gas inlet manifold 24 of humidifier stack 12. Flow of the first gas stream through first opening 46, between the heat exchanger 32 and the humidifier stack 12, is permitted with the bypass valve 80 closed.

Similarly, the second opening 134 of thermal isolation plate 160 is closed at its bottom surface, and is in flow communication at its top surface with the first gas outlet manifold 26 of humidifier stack 12. Therefore, flow of the first gas stream through bypass line 70 and into humidifier stack 12 through second opening 134 is permitted with the bypass valve 80 open.

Although the invention has been described with reference to specific embodiments thereof, it is not intended to be limited thereto. Rather, the invention is intended to cover all embodiments which may fall within the scope of the following claims.

What is claimed is:

1. An integrated gas management device (GMD), comprising:
   (a) a gas-to-gas humidifier core comprising:
      a stack of humidifier plates separated by moisture-permeable membranes or a bundle of tubes, each of the tubes having a tube wall comprising a water permeable membrane;
      one or more first gas flow passages;
      one or more second gas flow passages;
      a first end and a second end;
      a first gas inlet manifold and a first gas outlet manifold in flow communication with the first gas flow passages; and
      a second gas inlet manifold and a second gas outlet manifold in flow communication with the second gas flow passages;
      wherein the manifolds extend through the humidifier core from the first end to the second end;
   (b) a heat exchanger attached to the first end of the humidifier core, the heat exchanger comprising at least one heat exchanger first gas flow passage extending along the length of the heat exchanger and at least one coolant flow passage extending in a counter-flow or co-flow configuration with
      the at least one first heat exchanger gas flow passage, the heat exchanger further comprising a first gas outlet opening aligned with the first gas inlet manifold of the humidifier core, the first gas outlet opening through which the at least one first heat exchanger gas flow passage is in flow communication with the first gas inlet manifold of the humidifier core,
   a wall of the heat exchanger interior to the GMD forming an end plate of the humidifier core which compresses the humidifier core when assembled;
   an exterior wall of the heat exchanger forming an exterior wall of the GMD; and
   (c) a second component attached to the second end of the humidifier core, and a wall of the second component forming an exterior wall of the GMD,
   a wall of the second component interior to the GMD forming an end plate of the humidifier core which compresses the humidifier core during assembly.

2. The integrated GMD according to claim 1, further comprising a thermal isolation plate positioned between the humidifier core and wall of the heat exchanger interior to the GMD, wherein the thermal isolation plate is comprised of a plastic material,
   wherein the thermal isolation plate includes a first gas opening through which flow communication is provided between the first gas outlet opening of the heat exchanger and the first gas inlet manifold of the humidifier; and
   wherein the thermal isolation plate closes the first gas outlet manifold, the second gas inlet manifold and the second gas outlet manifold at the first end the humidifier core.

3. The integrated GMD according to claim 1, further comprising a bypass line having a first end in flow communication with the first gas inlet manifold of the humidifier core and a second end in flow communication with the first gas outlet manifold of the humidifier core; and wherein the bypass line is located along one of the exterior walls of the GMD formed by the heat exchanger or second component.

4. The integrated GMD according to claim 1, further comprising an anode gas heater for heating a hydrogen-containing reductant gas stream;
   wherein the anode gas heater is integrated with the heat exchanger, and wherein the heat exchanger is a three-fluid heat exchanger which further comprises at least one reductant gas flow passage.

5. The integrated GMD according to claim 1,
   wherein the humidifier plates and the membranes of the humidifier stack are sealed to one another by compression; and
   wherein the wall of the heat exchanger interior to the GMD and a thermal isolation plate are mechanically attached to the humidifier stack and compress the humidifier core when assembled.

6. The integrated GMD according to claim 5,
   wherein the humidifier plates comprise flexible plastic plates; and
   wherein the heat exchanger comprises a rigid, brazed assembly comprising a stack of plate pairs and the rigid assembly compresses the flexible plastic plates when assembled.

7. The integrated GMD according to claim 5, further comprising a thermal isolation plate between the humidifier core and the heat exchanger,
   wherein the thermal isolation plate is comprised of a plastic material; and
   wherein the thermal isolation plate provides a flat sealing surface against which the humidifier stack is compressed.

8. The integrated GMD according to claim 7, wherein the thermal isolation plate has a thickness of about 0.5-20 mm.

9. The integrated GMD according to claim 1, wherein a rigid structural end plate is attached to the second component.

10. The integrated GMD according to claim 1, wherein a surface of the heat exchanger which faces away from the humidifier core is provided with a coolant inlet fitting and a coolant outlet fitting, wherein the coolant inlet and outlet fittings are in flow communication with the at least one coolant flow passage of the heat exchanger.

11. The integrated GMD according to claim 1, wherein no structural humidifier end plate is provided between the heat exchanger and the gas-to-gas humidifier core.

12. The integrated GMD according to claim 1, wherein the second component is a water separator.

13. The integrated GMD according to claim 1, wherein the heat exchanger is a three-fluid heat exchanger.

14. The integrated GMD according to claim 12, wherein a first gas inlet is positioned in the wall of the water separator interior to the GMD and the first gas inlet of the water separator is aligned with the first gas outlet manifold of the humidifier core.

15. The integrated GMD according to claim 14, wherein a second gas inlet is positioned in the wall of the water separator interior to the GMD and the second gas inlet of the water separator is aligned with the second gas outlet manifold of the humidifier core.

16. The integrated GMD according to claim 15, wherein the water separator comprises a first gas outlet in an exterior wall connected to the first gas inlet in the wall of the water separator interior to the GMD.

17. The integrated GMD according to claim 16, wherein the water separator comprises a second gas outlet in an exterior wall connected to the second gas inlet in the wall of the water separator interior to the GMD.

18. The integrated GMD according to claim 17, wherein the second gas contains water vapor, and the second gas flows through the GMD in the following order: into the second gas inlet in the exterior wall of the water separator, into the second gas inlet manifold of the humidifier core, diagonally across the humidifier core, into the second gas outlet manifold of the humidifier core, into the second gas inlet in the wall of the water separator interior to the GMD, through a water separation chamber, and out of the second gas outlet in the exterior wall of the water separator.

* * * * *